US012580704B2

(12) United States Patent
Qin et al.

(10) Patent No.:     US 12,580,704 B2
(45) Date of Patent:        Mar. 17, 2026

(54) HIGH CAPACITY DMRS SEQUENCES FOR A COMMUNICATION SYSTEM

(71) Applicant: HUAWEI TECHNOLOGIES CO., LTD., Shenzhen (CN)

(72) Inventors: Yi Qin, Shanghai (CN); Peng Wang, Kista (SE); Branislav M. Popovic, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 18/514,941

(22) Filed: Nov. 20, 2023

(65) Prior Publication Data

US 2024/0195559 A1     Jun. 13, 2024

Related U.S. Application Data

(63) Continuation of application No. PCT/EP2021/066912, filed on Jun. 22, 2021.

(51) Int. Cl.
*H04L 5/00*          (2006.01)
*H04L 5/14*          (2006.01)
(52) U.S. Cl.
CPC .......... *H04L 5/0048* (2013.01); *H04L 5/0007* (2013.01); *H04L 5/1453* (2013.01)
(58) Field of Classification Search
CPC ..................................................... H04L 5/0048
See application file for complete search history.

(56) References Cited

PUBLICATIONS

ZTE:"Low PAPR RS." 3GPP TSG RAN WG1#96 Athens, Greece, Feb. 25-Mar. 1, 2019. R1-1901637, total 14 pages.
Huawei, HiSilicon:"Enhancements on DMRS in Rel-18." 3GPP TSG-RAN WG1 Meeting #111 Toulouse, France, Nov. 14-18, 2022. R1-2210914, total 23 pages.
Intel Corporation:"On the remaining details of DM-RS." 3GPP TSG RAN WG1 Meeting#91 Reno, USA, Nov. 27-Dec. 1, 2017. R1-1720076, total 20 pages.
3rd Generation Partnership Project; Technical Specification Group Radio Access Network; NR; Physical channels and modulation (Release 18). 3GPP TS 38.211 V18.0.0 (Sep. 2023). total 159 pages.
Motorola:"DM-RS Ports/Scrambling Sequence Design for DL Single Cell MU-MIMO." 3GPP TSG RAN WG1 Meeting #61 Montreal, Canada, May 10-14, 2010. R1-103185, total 6 pages.
3rd Generation Partnership Project; Technical Specification Group Radio Access Network; NR; Multiplexing and channel coding (Release 18). 3GPP TS 38.212 V18.0.0 (Sep. 2023). total 276 pages.

*Primary Examiner* — Y Lee
(74) *Attorney, Agent, or Firm* — WOMBLE BOND DICKINSON (US) LLP

(57)                ABSTRACT
A first communication device determines a DMRS sequence based on a cover code in a set of cover codes; and thereafter determines a DMRS by mapping the DMRS sequence onto one or more PRBs. The cover code is dependent on a DMRS antenna port index, and cover codes in the set of cover codes are orthogonal to each other in each PRB, and wherein a maximum correlation power between two cover codes in the set of cover codes is larger than 0 in each half PRB. Finally, the first communication device transmits the DMRS via a DMRS antenna port having DMRS antenna port index to a second communication device which receive the DMRS and associated data signal. The second communication device demodulates the associated data signal based on the received DMRS and the DMRS sequence.

20 Claims, 6 Drawing Sheets

HIGH CAPACITY DMRS SEQUENCES FOR A COMMUNICATION SYSTEM

CROSS-REFERENCE TO RELATED APPLICATIONS

This application is a continuation of International Application No. PCT/EP2021/066912, filed on Jun. 22, 2021, the disclosure of which is hereby incorporated by reference in its entirety.

TECHNICAL FIELD

The disclosure relates to a first communication device and a second communication device for high capacity DMRS sequences for a communication system. Furthermore, the disclosure also relates to corresponding methods and a computer program.

BACKGROUND

Demodulation reference signal (DMRS) sequences in 3GPP new radio (NR) Rel-15 are generated from pseudo-random noise (PN) sequences c(n) covered by length-2 orthogonal cover codes (OCCs), w(i), in frequency domain and time domain, respectively, where $i=0,1$, $x=0,1$, $w_0(0)=1$, $w_0(1)=1$, $w_1(0)=1$ and $w_1(1)=-1$.

The PN sequence c(n) is generated according to the formula:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad (1)$$

where $n=0,1, \ldots, N_{PN}-1$, with $N_{PN}=4N_{PRB}$ and $N_{PRB}$ being the number of physical resource blocks (PRBs) in the scheduled frequency band, $N_c=1600$, $x_1(0)=1$, $x_1(n)=0$ for $n=1, 2 \ldots, 30$. For $x_2(n)$, it is generated based on $$c_{init} = \sum_{i=0}^{30} x_2(i)2^i =$$

$$\left(2^{17}\left(N_{symb}^{slot}n_{s,f}^{\mu}+l+1\right)\left(2N_{ID}^{\tilde{n}_{SCID}}+1\right)2^{17}\left\lfloor\frac{\tilde{\lambda}}{2}\right\rfloor+2N_{ID}^{\tilde{n}_{SCID}}+\tilde{n}_{SCID}\right) \bmod 2^{31} \quad (2)$$

where $N_{symb}^{slot}=14$ is the number of OFDM symbols in a slot, $n_{s,f}^{\mu}$ is the index of the slot in a frame, l is the index of the OFDM symbol in the slot, $$\tilde{n}_{SCID} \in \{0, 1\}, N_{ID}^{\tilde{n}_{SCID}} \in \{0, 1, \ldots, 65535\}, \tilde{\lambda} \in \{0, 1, 2\}.$$

Note that the $c_{init}$ is dependent on the OFDM symbol index l, so is the sequence c(n). We thus rewrite c(n) as $c_l(n)$ for the OFDM symbol l.

There are totally 12 DMRS ports defined in NR, whose labels are 1000, 1001, . . . , 1011. In this disclosure, we will call the DMRS ports (p+1000) with index $p=0, 1, \ldots, 11$ for simplicity.

The DMRS sequence $a_p(n)$ mapped on two OFDM symbols $l=l_0$ and $l_1$ ($l_0<l_1$) can be expressed as $$a_p(n)=A_p(n)\cdot C(n), n=0,1, \ldots 2N_{PN}-1,$$
$$p=0,1, \ldots,11 \quad (3a)$$

where $$A_p(n) = w_{p\,mod\,2}(n \bmod 2)w_{\lfloor\frac{p}{6}\rfloor}\left(\left\lfloor\frac{n}{N_{PN}}\right\rfloor\right) \quad (3b)$$

is the cover code with $w_0(0)=1$, $w_0(1)=1$, $w_1(0)=1$ and $w_1(1)=-1$, and $w_p \bmod_2(n \bmod 2)$ and $$w_{\lfloor\frac{p}{6}\rfloor}\left(\left\lfloor\frac{n}{N_{PN}}\right\rfloor\right)$$

being the frequency-domain and time-domain OCCs, respectively, and $$C(n) = c_{l_0} + \left\lfloor\frac{n}{N_{PN}}\right\rfloor(l_1 - l_0)(n \bmod N_{PN}). \quad (3c)$$

is the base sequence. In 3GPP NR specification release 15, $l_1-l_0=1$.

But current standard supports only 12 orthogonal cover codes, and it would be not enough to support more antenna ports in order to improve the capacity in the future.

SUMMARY

Embodiments of the disclosure provide a solution which mitigates or solves the drawbacks and problems of conventional solutions.

Other embodiments of the disclosure provide a solution making it possible to support more DMRS ports in a communication system compared to conventional solutions.

According to a first aspect of the disclosure, a first communication device for a communication system is configured to determine a demodulation reference signal, DMRS, sequence based on a cover code in a set of cover codes;

determine a DMRS by mapping the DMRS sequence onto one or more physical resource blocks, PRBs, wherein the cover code is dependent on a DMRS antenna port index, and wherein cover codes in the set of cover codes are orthogonal to each other in each PRB, and wherein a maximum correlation power between two cover codes in the set of cover codes is larger than 0 in each half PRB; and transmit the DMRS via a DMRS antenna port having DMRS antenna port index to a second communication device.

That the maximum correlation power between two cover codes in the set of cover codes is larger than 0 in each half PRB may be understood as that if a half PRB is defined as the first S/2 subcarriers or the last S/2 subcarriers of a PRB, where S>0 is the number of subcarriers in one PRB, the maximum correlation power is larger than 0 in such half PRB. It may be noted that in NR, S=12, i.e., one half PRB is the subcarriers #0 to #5 of a PRB or subcarriers #6 to #11 of a PRB.

An advantage of the first communication device according to the first aspect is that more DMRS antenna ports can be supported for data transmission because the DMRS sequences from different antenna ports have not necessarily to be orthogonal to each other in each half PRB. Additionally, all DMRS sequences are pair-wise orthogonal in each PRB, so that the interference between the DMRS sequences can be kept small.

In an embodiment, a maximum correlation power between two cover codes in the set of cover codes comprises 1.0, 0.5 or 0.25 in each half PRB.

An advantage of this embodiment is that the interference between different DMRSs in each half PRB may be controlled to a given level. When the maximum correlation power is 1.0 the interference between two DMRS in a DMRS pair is large which can be assigned to spatially separated client devices (such as user equipment or UE) to avoid interference between them, while the interference between two DMRS in a in another DMRS pair can be very small or be considered as to be zero, which can be assigned to closely located client devices. When the maximum correlation power is 0.5 or 0.25, the interference between any two DMRSs is kept at a low level. Hence, all the DMRSs can be freely assigned to client devices regardless of their locations without incurring significant interference between the client devices.

In an embodiment, at least one cover code in the set of cover codes in each PRB is given by the formula $$
\begin{bmatrix}
e^{j\alpha_u} w_{q\,mod\,2}(0)w_{\lfloor \frac{q}{6}\rfloor}(0) & e^{j\lambda_u} w_{q\,mod\,2}(0)w_{\lfloor \frac{q}{6}\rfloor}(1) \\
e^{j\beta_u} w_{q\,mod\,2}(1)w_{\lfloor \frac{q}{6}\rfloor}(0) & e^{j\rho_u} w_{q\,mod\,2}(1)w_{\lfloor \frac{q}{6}\rfloor}(1) \\
-e^{j\alpha_u} w_{q\,mod\,2}(0)w_{\lfloor \frac{q}{6}\rfloor}(0) & -e^{j\lambda_u} w_{q\,mod\,2}(0)w_{\lfloor \frac{q}{6}\rfloor}(1) \\
-e^{j\beta_u} w_{q\,mod\,2}(1)w_{\lfloor \frac{q}{6}\rfloor}(0) & -e^{j\rho_u} w_{q\,mod\,2}(1)w_{\lfloor \frac{q}{6}\rfloor}(1)
\end{bmatrix}
$$

where q is determined by the DMRS antenna port index, and $\alpha_u, \beta_u, \lambda_u, \rho_u$ are real numbers for PRB index u where u is an integer equal to or larger than 0 and $w_0(0)=1$, $w_0(1)=1$, $w_1(0)=1$, $w_1(1)=-1$.

An advantage of this embodiment is that the at least one cover code can be directly used for generating more DMRS sequences which are orthogonal to each other and to the legacy DMRS sequences in each PRB.

In an embodiment, at least one cover code in the set of cover codes in each PRB is given by the formula $$
\begin{bmatrix}
e^{j\alpha_u} & e^{j\lambda_u} \\
e^{j\beta_u} & e^{j\rho_u} \\
-e^{j\alpha_u} & -e^{j\lambda_u} \\
-e^{j\beta_u} & -e^{j\rho_u}
\end{bmatrix}
$$

where $\mu_u, \beta_u, \lambda_u, \rho_u$ are real numbers for PRB index u where u is an integer equal to or larger than 0.

An advantage of this embodiment is that only one cover code is needed to generate all new DMRS sequences which are orthogonal to each other and to the legacy NR DMRS sequences in each PRB.

In an embodiment, the DMRS sequence is obtained based on the at least one cover code and a DMRS sequence associated with an another DMRS antenna port index.

An advantage of this embodiment is that the legacy NR DMRS sequences can be reused to generate new DMRS sequences with only one cover code.

In an embodiment, the at least one cover code is a combination of a time domain cover code and a frequency domain cover code when $\mu_u+\rho_u=\beta_u+\lambda_u$.

An advantage of this embodiment is that the time domain cover code and frequency domain cover code can be defined and applied separately thereby providing lower complexity and easier implementation.

In an embodiment, at least one cover code in the set of cover codes is obtained based on an additional cover code given by the formula $$
\begin{bmatrix}
e^{j\alpha_u} & e^{j\lambda_u} \\
e^{j\beta_u} & e^{j\rho_u} \\
-e^{j\alpha_u} & -e^{j\lambda_u} \\
-e^{j\beta_u} & -e^{j\rho_u}
\end{bmatrix}
$$

and an orthogonal cover code where $\alpha_u, \beta_u, \lambda_u, \rho_u$ are real numbers for PRB index u where u is an integer equal to or larger than 0.

An advantage of this embodiment is that the legacy NR orthogonal cover code can be reused to generate the new cover code by one additional cover code. The resulting DMRS sequences are orthogonal to each other and to the legacy NR DMRS sequences in each PRB.

In an embodiment, the additional cover code is a combination of a time domain additional cover code and a frequency domain additional cover code when $\alpha_u+\rho_u=\beta_u+\lambda_u$.

An advantage of this embodiment is that the time domain cover code and frequency domain cover code can be defined and applied separately thereby providing lower complexity and easier implementation.

In an embodiment, the values of $\alpha_u, \beta_u, \lambda_u, \rho_u$ are equal to one of the following combinations:

[0,0,0,0]

[π/2, π/2, π/2,π/2]

[0, π, 0,π]

[0, π/2, 0, π/2]

[0,3π/2, 0,3π/2]

[π/2, π/2,0, π]

[π/2, π, 0, π/2]

[π/2,0,0,3π/2]

[π/2+uπ, (1+u)π, uππ/2+uπ]

[π/2+uπ, uπ, uπ, 3π/2+uπ].

An advantage of this embodiment is that these values can be used to generate the cover code or the additional cover code. With values [0,0,0,0], [π/2, π/2, π/2, π/2] and [0, π, 0, π] there will be only one strong other interfering DMRS sequence for each DMRS sequence in each half PRB. With values [0, π/2,0, π/2] and [0,3π/2, 0,3π/2] the maximum correlation power within each half-PRB is 0.5, so that the interference within each half-PRB is reduced. With values [π/2, π/2,0, π], [π/2,π, 0, π/2] and [π/2,0,0,3π/2] the maximum correlation power within each half-PRB is ¼, so that the interference within each half-PRB is further reduced. With values [π/2+uπ, (1+u)π, uππ/2+uπ] and [π/2+uπ, uπ, uπ, 3π/2+uπ] addition OCC having value [1, −1] is added to every two consecutive PRBs to further cancel the DMRS interference.

In an embodiment, the values of $\alpha_u, \beta_u, \lambda_u, \rho_u$ are dependent on a PRB index u where u is an integer equal to or larger than 0.

An advantage of this embodiment is that additional OCC among PRBs or randomization among PRBs are applied to reduce or randomize interference between the DMRS sequences.

In an embodiment, the first communication device is further configured to obtain a first indicator indicating at least one DMRS antenna port index between 0-23;

obtain a first indicator and a second indicator, wherein the first indicator indicates at least one DMRS antenna port index between 0-11 or 12-23, and the second indicator indicates whether the at least one DMRS antenna port index is between 0-11 or 12-23; or obtain a first indicator and a second indicator, wherein the first indicator indicates at least one DMRS antenna port index between 0-11, and the second indicator indicates any of the DMRS sequence, the cover code, or an additional cover code for the at least one DMRS antenna port index.

An advantage of this embodiment is that:

the DMRS antenna port index can be directly indicated by the use of an indicator, or a legacy NR indicator of a DMRS antenna port index can be reused together with an additional indicator to indicate the new DMRS antenna port indexes, or a legacy NR indicator of a DMRS antenna port index can be reused and the range of the legacy DMRS antenna port index is also reused, but a network access node can indicate whether a legacy cover code or new cover code is used for the DMRS antenna port.

According to a second aspect of the disclosure, a second communication device is configured to receive DMRS and associated data signal on one or more PRBs from a first communication device;

determine a DMRS sequence based on a cover code in a set of cover codes, wherein the cover code is dependent on a DMRS antenna port index, and wherein the cover codes in the set of cover codes are orthogonal to each other in each PRB, and wherein a maximum correlation power between two cover codes in the set of cover codes is larger than 0 in each half PRB; and demodulate the associated data signal based on the received DMRS and the DMRS sequence.

An advantage of the second communication device according to the second aspect is that more DMRS antenna ports can be supported for data reception because the DMRS sequences from different antenna ports have not necessarily to be orthogonal to each other in each half PRB. Additionally, all DMRS sequences are pair-wise orthogonal in each PRB, so that the interference between DMRS sequences is kept small.

In an embodiment, a maximum correlation power between two cover codes in the set of cover codes comprises 1.0, 0.5 or 0.25 in each half PRB.

An advantage of this embodiment is that the interference between different DMRSs in each half PRB may be controlled to a given level. When the maximum correlation power is 1.0 the interference between two DMRS in a DMRS pair is large which can be assigned to spatially separated client devices (such as UEs) to avoid interference between them, while the interference between two DMRS in a in another DMRS pair can be very small or be considered as to be zero, which can be assigned to closely located client devices. When the maximum correlation power is 0.5 or 0.25, the interference between any two DMRSs is kept at a low level. Hence, all the DMRSs can be freely assigned to client devices regardless of their locations without incurring significant interference between the client devices.

In an embodiment, at least one cover code in the set of cover codes in each PRB is given by the formula $$
\begin{bmatrix}
e^{j\alpha_u} w_{q\,mod\,2}(0) w_{\lfloor\frac{q}{6}\rfloor}(0) & e^{j\lambda_u} w_{q\,mod\,2}(0) w_{\lfloor\frac{q}{6}\rfloor}(1) \\
e^{j\beta_u} w_{q\,mod\,2}(1) w_{\lfloor\frac{q}{6}\rfloor}(0) & e^{j\rho_u} w_{q\,mod\,2}(1) w_{\lfloor\frac{q}{6}\rfloor}(1) \\
-e^{j\alpha_u} w_{q\,mod\,2}(0) w_{\lfloor\frac{q}{6}\rfloor}(0) & -e^{j\lambda_u} w_{q\,mod\,2}(0) w_{\lfloor\frac{q}{6}\rfloor}(1) \\
-e^{j\beta_u} w_{q\,mod\,2}(1) w_{\lfloor\frac{q}{6}\rfloor}(0) & -e^{j\rho_u} w_{q\,mod\,2}(1) w_{\lfloor\frac{q}{6}\rfloor}(1)
\end{bmatrix}
$$

where q is determined by the DMRS antenna port index, and $\alpha_u$, $\beta_u$, $\lambda_u$, $\rho_u$ are real numbers for PRB index u where u is an integer equal to or larger than 0 and $w_0(0)=1$, $w_0(1)=1$, $w_1(0)=1$, $w_1(1)=-1$.

An advantage of this embodiment is that the at least one cover code can be directly used for generating more DMRS sequences which are orthogonal to each other and to the legacy DMRS sequences in each PRB.

In an embodiment, at least one cover code in the set of cover codes in each PRB is given by the formula $$
\begin{bmatrix}
e^{j\alpha_u} & e^{j\lambda_u} \\
e^{j\beta_u} & e^{j\rho_u} \\
-e^{j\alpha_u} & -e^{j\lambda_u} \\
-e^{j\beta_u} & -e^{j\rho_u}
\end{bmatrix}
$$

where $\alpha_u$, $\beta_u$, $\lambda_u$, $\rho_u$ are real numbers for PRB index u where u is an integer equal to or larger than 0.

An advantage of this embodiment is that only one cover code is needed to generate all new DMRS sequences which are orthogonal to each other and to the legacy NR DMRS sequences in each PRB.

In an embodiment, the DMRS sequence is obtained based on the at least one cover code and a DMRS sequence associated with an another DMRS antenna port index.

An advantage of this embodiment is that the legacy NR DMRS sequences can be reused to generate new DMRS sequences with only one cover code.

In an embodiment, the at least one cover code is a combination of a time domain cover code and a frequency domain cover code when $\alpha_u+\rho_u=\beta_y+\lambda_u$.

An advantage of this embodiment is that the time domain cover code and frequency domain cover code can be defined and applied separately thereby providing lower complexity and easier implementation.

In an embodiment, at least one cover code in the set of cover codes is obtained based on an additional cover code given by the formula $$
\begin{bmatrix}
e^{j\alpha_u} & e^{j\lambda_u} \\
e^{j\beta_u} & e^{j\rho_u} \\
-e^{j\alpha_u} & -e^{j\lambda_u} \\
-e^{j\beta_u} & -e^{j\rho_u}
\end{bmatrix}
$$

and an orthogonal cover code where $\alpha_u$, $\beta_u$, $\lambda_u$, $\rho_u$ are real numbers for PRB index u where u is an integer equal to or larger than 0.

An advantage of this embodiment is that the legacy NR orthogonal cover code can be reused to generate the new cover code by one additional cover code. The resulting DMRS sequences are orthogonal to each other and to the legacy NR DMRS sequences in each PRB.

In an embodiment, the additional cover code is a combination of a time domain additional cover code and a frequency domain additional cover code when $\alpha_u+\rho_u=\beta_u+\lambda_u$.

An advantage of this embodiment is that the time domain cover code and frequency domain cover code can be defined and applied separately thereby providing lower complexity and easier implementation.

In an embodiment, the values of $\alpha_u$, $\beta_u$, $\lambda_u$, $\rho_u$ are equal to one of the following combinations:

$[0,0,0,0]$ $[\pi/2, \pi/2, \pi/2, \pi/2]$ $[0, \pi, 0, \pi]$ $[0, \pi/2, 0, \pi/2]$ $[0, 3\pi/2, 0, 3\pi/2]$ $[\pi/2, \pi/2, 0, \pi]$ $[\pi/2, \pi, 0, \pi/2]$ $[\pi/2, 0, 0, 3\pi/2]$ $[\pi/2+u\pi, (1+u)\pi, u\pi\pi/2+u\pi]$ $[\pi/2+u\pi, u\pi, u\pi, 3\pi/2+u\pi]$.

An advantage of this embodiment is that these values can be used to generate the cover code or the additional cover code. With values $[0,0,0,0]$, $[\pi/2, \pi/2, \pi/2, \pi/2]$ and $[0, \pi, 0, \pi]$ there will be only one strong other interfering DMRS sequence for each DMRS sequence in each half PRB. With values $[0, \pi/2, 0, \pi/2]$ and $[0, 3\pi/2, 0, 3\pi/2]$ the maximum correlation power within each half-PRB is 0.5, so that the interference within each half-PRB is reduced. With values $[\pi/2, \pi/2, 0, \pi]$, $[\pi/2, \pi, 0, \pi/2]$ and $[\pi/2, 0, 0, 3\pi/2]$ the maximum correlation power within each half-PRB is $\frac{1}{4}$, so that the interference within each half-PRB is further reduced. With values $[\pi/2+u\pi, (1+u)\pi, u\pi\pi/2+u\pi]$ and $[\pi/2+u\pi, u\pi, u\pi, 3\pi/2+u\pi]$ addition OCC having value $[1, -1]$ is added to every two consecutive PRBs to further cancel the DMRS interference.

In an embodiment, the values of $\alpha_u$, $\beta_u$, $\lambda_u$, $\rho_u$ are dependent on a PRB index u where u is an integer equal to or larger than 0.

An advantage of this embodiment is that additional OCC among PRBs or randomization among PRBs are applied to reduce or randomize interference between the DMRS sequences.

In an embodiment, the second communication device being configured to obtain a first indicator indicating at least one DMRS antenna port index between 0-23;

obtain a first indicator and a second indicator, wherein the first indicator indicates at least one DMRS antenna port index between 0-11 or 12-23, and the second indicator indicates whether the at least one DMRS antenna port index is between 0-11 or 12-23; or obtain a first indicator and a second indicator, wherein the first indicator indicates at least one DMRS antenna port index between 0-11, and the second indicator indicates any of the DMRS sequence, the cover code, or an additional cover code for the at least one DMRS antenna port index.

An advantage of this embodiment is that:

the DMRS antenna port index can be directly indicated by the use of an indicator, or a legacy NR indicator of a DMRS antenna port index can be reused together with an additional indicator to indicate the new DMRS antenna port indexes, or a legacy NR indicator of a DMRS antenna port index can be reused and the range of the legacy DMRS antenna port index is also reused, but a network access node can indicate whether a legacy cover code or new cover code is used for the DMRS antenna port.

According to a third aspect of the disclosure, a method for a first communication device comprises determining a demodulation reference signal, DMRS, sequence based on a cover code in a set of cover codes;

determining a DMRS by mapping the DMRS sequence onto one or more physical resource blocks, PRBs, wherein the cover code is dependent on a DMRS antenna port index, and wherein cover codes in the set of cover codes are orthogonal to each other in each PRB, and wherein a maximum correlation power between two cover codes in the set of cover codes is larger than 0 in each half PRB; and transmitting the DMRS via a DMRS antenna port having DMRS antenna port index to a second communication device.

The method according to the third aspect can be extended into embodiments corresponding to the embodiments of the first communication device according to the first aspect. Hence, an embodiment of the method comprises the feature(s) of the corresponding embodiment of the first communication device.

The advantages of the methods according to the third aspect are the same as those for the corresponding embodiments of the first communication device according to the first aspect.

According to a fourth aspect of the disclosure, a method for a second communication device comprises receiving DMRS and associated data signal on one or more PRBs from a first communication device;

determining a DMRS sequence based on a cover code in a set of cover codes, wherein the cover code is dependent on a DMRS antenna port index, and wherein the cover codes in the set of cover codes are orthogonal to each other in each PRB, and wherein a maximum correlation power between two cover codes in the set of cover codes is larger than 0 in each half PRB; and demodulating the associated data signal based on the received DMRS and the DMRS sequence.

The method according to the fourth aspect can be extended into embodiments corresponding to the embodiments of the second communication device according to the second aspect. Hence, an embodiment of the method comprises the feature(s) of the corresponding embodiments of the second communication device.

The advantages of the methods according to the fourth aspect are the same as those for the corresponding embodiments of the second communication device according to the second aspect.

Therefore, according to a fifth aspect of the disclosure, a first communication device for a communication system is configured to obtain a first indicator indicating at least one DMRS antenna port index between 0-23;

obtain a first indicator and a second indicator, wherein the first indicator indicates at least one DMRS antenna port index between 0-11 or 12-23, and the second indicator indicates whether the at least one DMRS antenna port index is between 0-11 or 12-23; or obtain a first indicator and a second indicator, wherein the first indicator indicates at least one DMRS antenna port index between 0-11, and the second indicator indicates any of the DMRS sequence, the cover code, or an additional cover code for the at least one DMRS antenna port index.

It is to be noted that if the first communication device is part of a client device the indicator(s) may be received in a downlink from a network access node such as the second communication device.

If the first communication device is part of a network access node, the indicators may be obtained from a memory, buffer, table, etc. in the network access node itself or in another network node. In this case the first communication device may also be configured to transmit the indicators in the downlink to a client device such as the second communication device.

The corresponding method for the first communication device comprises:

obtaining a first indicator indicating at least one DMRS antenna port index between 0-23;

obtaining a first indicator and a second indicator, wherein the first indicator indicates at least one DMRS antenna port index between 0-11 or 12-23, and the second indicator indicates whether the at least one DMRS antenna port index is between 0-11 or 12-23; or obtaining a first indicator and a second indicator, wherein the first indicator indicates at least one DMRS antenna port index between 0-11, and the second indicator indicates any of the DMRS sequence, the cover code, or an additional cover code for the at least one DMRS antenna port index.

Therefore, according to a sixth aspect of the disclosure, a second communication device for a communication system is configured to obtain a first indicator indicating at least one DMRS antenna port index between 0-23;

obtain a first indicator and a second indicator, wherein the first indicator indicates at least one DMRS antenna port index between 0-11 or 12-23, and the second indicator indicates whether the at least one DMRS antenna port index is between 0-11 or 12-23; or obtain a first indicator and a second indicator, wherein the first indicator indicates at least one DMRS antenna port index between 0-11, and the second indicator indicates any of the DMRS sequence, the cover code, or an additional cover code for the at least one DMRS antenna port index.

It is to be noted that if the second communication device is part of a client device the indicator(s) may be received in a downlink from a network access node such as the first communication device.

If the second communication device is part of a network access node, the indicators may be obtained from a memory, buffer, table, etc. in the network access node itself or in another network node. In this case the second communication device may also be configured to transmit the indicators in the downlink to a client device such as the first communication device.

The corresponding method for the second communication device comprises: obtaining a first indicator indicating at least one DMRS antenna port index between 0-23;

obtaining a first indicator and a second indicator, wherein the first indicator indicates at least one DMRS antenna port index between 0-11 or 12-23, and the second indicator indicates whether the at least one DMRS antenna port index is between 0-11 or 12-23; or obtaining a first indicator and a second indicator, wherein the first indicator indicates at least one DMRS antenna port index between 0-11, and the second indicator indicates any of the DMRS sequence, the cover code, or an additional cover code for the at least one DMRS antenna port index.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Figure 1:
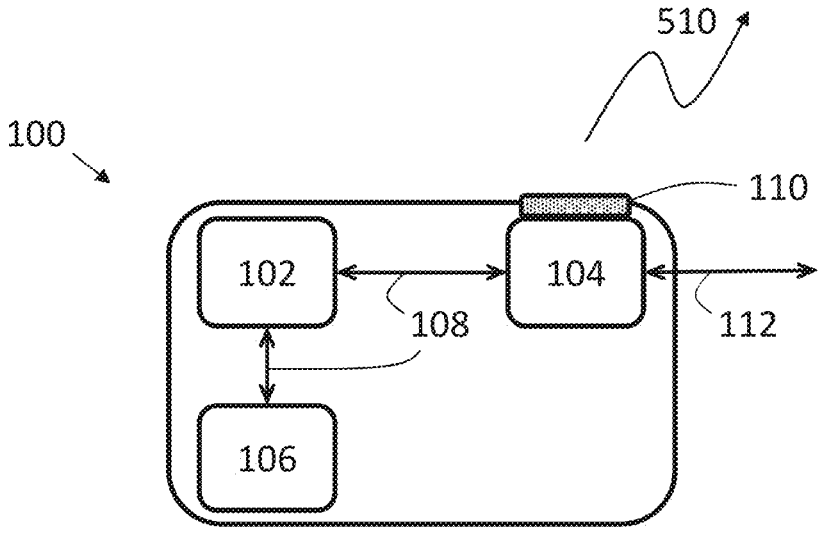
FIG. 1 shows a first communication device according to an embodiment/example of the disclosure.

DMRS pattern is flexible in NR, and the following example shows a DMRS pattern:

Each DMRS sequence is mapped on 2 OFDM symbols $l_0=0$ and $l_1=1$.

The element $a_p(n)$, $(n=0, 1, \ldots, 2N_{PN}-1)$ of the DMRS sequence is mapped on the t-th sub-carrier of the u-th PRB in the l-th OFDM symbol, where $$t = 2\left\lfloor \frac{p \bmod 6}{2} \right\rfloor + n \bmod 2 + 6\left\lfloor \frac{n \bmod 4}{2} \right\rfloor \in \{0, 1, \ldots, 11\}$$

$$u = \left\lfloor \frac{n \bmod N_{PN}}{4} \right\rfloor \in \{0, 1, \ldots, N_{PRB} - 1\}$$

$$l = \left\lfloor \frac{n}{N_{PN}} \right\rfloor$$

Note that u in this disclosure is the index of a PRB. We assume that the PRB is indexed from 0 in the following discussion, but the proposed solution can also be applied to any indexing of a starting PRB, i.e., u can start from any integer values $u_{start}$. We further assume that the PRBs are continuous in the following discussion, but the proposed solution can also be applied to discontinuous PRBs, i.e. the value of u can be discontinuous.

The 12 NR DMRS ports $\{p|p=0, 1, \ldots, 11\}$ can be divided into 3 subsets, i.e., $\{0, 1, 6, 7\}$, $\{2, 3, 8, 9\}$ and $\{4, 5, 10, 11\}$, and being mapped on 3 orthogonal frequency resources, respectively. Any two NR DMRS ports mapped on different orthogonal frequency resources are naturally orthogonal to each other due to non-overlapping frequency mapping.

Furthermore, from Eq. (3) it can be verified that $$\sum_{n=0}^{1} a_p(2v+n)a_q^*(2v+n) + \sum_{n=0}^{1} a_p(2v+N_{PN}+n)a_q^*(2v+N_{PN}+n) = \tag{4}$$

$$0, \forall v = 0, 1, \cdots, \frac{N_{PN}}{2} - 1$$

for $\forall p \neq q$, p, q $\in$ {0, 1, 6, 7}, p, q $\in$ {2, 3, 8, 9} or p, q $\in$ {4, 5, 10, 11}. The proof of Eq. (4) can be found in the Appendix. In other words, any two NR DMRS ports mapped on the same orthogonal frequency resources are orthogonal to each other in every half-PRB within two OFDM symbols. This property guarantees good channel estimation performance for the system even when these NR DMRS ports are transmitted simultaneously, because in practice the channel experienced by each NR DMRS port is approximately flat both in every half-PRB and two OFDM symbols, and so the orthogonality between these NR DMRS ports can be approximately maintained at the receiver.

When multiple DMRSs are used for multi-user transmission, a gNb will apply precoding to reduce interference between user equipments (UEs) in the spatial domain. However, in real system, spatial orthogonality cannot be guaranteed, because:

The precoding is calculated based on either the channel estimates measured based on uplink (UL) sounding reference signals (SRSs) in the time division duplex (TDD) mode, or the limited feedback based on UE measurement in the frequency division duplex (FDD) mode. The channel estimation error and the quantization error will make the precoding not well match the channel, making the DMRSs for different UEs not orthogonal to each other;

The channel of each UE can be frequency-selective and different for different resource elements (REs), while in NR a common precoding is applied to a number of consecutive REs which is specified as Precoding Resource Block Group (PRB) in standard. So, the precoding cannot perfectly match the channel in the frequency domain, making the DMRSs for different UEs not orthogonal to each other;

The channel of each UE can be time-selective due to UE mobility and different in different orthogonal frequency division multiplexing (OFDM) symbols. While the precoding for DMRS/data transmission is based on the SRS measurement or UE feedback which correspond to different OFDM symbols. So, the precoding for DMRS/data cannot perfectly match the experienced channel, making the DMRSs for different UEs not orthogonal to each other.

According to the NR DMRS sequence and mapping introduced previously, there are only 12 NR DMRS ports in total, which are mutually orthogonal within every half-RB and the 2 OFDM symbols. In order to increase the cell capacity, it is desirable to transmit more than 12 layers for multi-user multiple input multiple output (MU-MIMO), e.g., 24 layers. This requirement is proposed by many companies in 5G-Advanced.

In the current NR specification, if a gNb needs to be configured to transmit more than 12-layer MU-MIMO, one possible way is to configure different values of $\bar{n}_{SCID}^{\lambda}$ to different users. As shown in Eq. (2) DMRS sequences with different $\bar{n}_{SCID}^{\lambda}$ values correspond to different $c_{init}$. Thus, the DMRS sequences are different for each layer. Since there are two possible values of $\bar{n}_{SCID}^{\lambda}$, i.e., $\bar{n}_{SCID}^{\lambda}=0$ or 1, this solution can support up to 24 different DMRS sequences, i.e., 24 layers.

According to Eq. (1)-(3), if 24 DMRS sequences are generated by $\bar{n}_{SCID}^{\lambda}=0,1$, there are 12 DMRS sequences generated by $\bar{n}_{SCID}^{\lambda}=0$ which are orthogonal to each other, and the other 12 DMRS sequences generated by $\bar{n}_{SCID}^{\lambda}=1$ which are also orthogonal to each other. However, the first 12 DMRS sequences are not orthogonal to the second 12 DMRS sequences because $\bar{n}_{SCID}^{\lambda}=0$ and 1 correspond to different initial values $c_{init}$ of the PN sequences c(n) and the resultant PN sequences are not orthogonal to each other. If the DMRS sequences using different $\bar{n}_{SCID}^{\lambda}$ are not perfectly separated in the spatial domain, there will be non-negligible DMRS interference between different layers, which may lead to severe performance degradation. In practical system, the spatial separation of different DMRSs is always imperfect even if zero forcing precoding is applied, because of the following reasons:

The precoding is calculated based on either limited feedback in the FDD case or channel measured based on SRS in the TDD case, where quantization error and measurement error will make the precoding imperfect and not well match the channel, so the UE cannot be orthogonal;

The channel of each UE may be frequency selective and so different across REs due to the multi-path effect, while in NR the same precoding is applied to a number of consecutive REs, referred to as a Precoding Resource Block Group (PRG) specified in standard. So, the precoding cannot well match the channel of each UE and make the UEs orthogonal;

The channel of each UE may be time selective and hence different for different OFDM symbols due to UE mobility, while there is time interval between limited feedback/SRS measurement and downlink data transmission. Thus, the precoding cannot well match the channel of every OFDM symbol, especial those in the interval, and in turn cannot make the transmission between UEs orthogonal.

If the same NR DMRS sequences are reused on two other OFDM symbols for some UEs, these two other OFDM symbols cannot be used for the data transmission to other UEs, as it otherwise causes severe interference between the DMRS of one UE and the data of another UE, which should be avoided. As a consequence, the DMRS transmission will occupy more time-frequency resources and leads to reduced spectral efficiency.

Hence, an objective herein is to increase the DMRS capacity without increasing the overhead in a communication system. Another objective of the present disclosure is to support maximum 24-layer transmission by introducing 12 new DMRS ports besides the existing 12 NR DMRS ports, i.e., 24 DMRS ports in total, where the 24 DMRS ports are pairwise orthogonal. Therefore, in embodiments of the disclosure, it is proposed 12 new DMRS sequences in addition to the 12 legacy NR DRMS sequences, mapped on the same resources as legacy NR DMRSs, where the 12 new DMRS sequences are mutually orthogonal to each other, and in the meanwhile orthogonal to each of the legacy NR DMRS sequences, in each PRB. Furthermore, the 12 new DMRS sequences are also mutually orthogonal to each other in each half-PRB, which is the same feature as the legacy NR DMRS sequences.

FIG. 1 shows a first communication device 100 according to an embodiment of the disclosure. In the embodiment shown in FIG. 1, the first communication device 100 comprises a processor 102, a transceiver 104 and a memory 106. The processor 102 may be coupled to the transceiver 104 and the memory 106 by communication means 108 known in the art. The first communication device 100 may further comprise an antenna or antenna array 110 coupled to the transceiver 104, which means that the first communication device 100 may be configured for wireless communications in a wireless communication system. That the first communication device 100 may be configured to perform certain actions can in this disclosure be understood to mean that the first communication device 100 comprises suitable means, such as e.g. the processor 102 and the transceiver 104, configured to perform said actions.

The processor 102 of the first communication device 100 may be referred to as one or more general-purpose central processing units (CPUs), one or more digital signal processors (DSPs), one or more application-specific integrated circuits (ASICs), one or more field programmable gate arrays (FPGAs), one or more programmable logic devices, one or more discrete gates, one or more transistor logic devices, one or more discrete hardware components, and one or more chipsets. The memory 106 of the first communication device 100 may be a read-only memory, a random access memory, or a non-volatile random access memory (NVRAM). The transceiver 104 of the first communication device 100 may be a transceiver circuit, a power controller, an antenna, or an interface which communicates with other modules or devices. In embodiments, the transceiver 104 of the first communication device 100 may be a separate chipset or being integrated with the processor 102 in one chipset. While in some embodiments, the processor 102, the transceiver 104, and the memory 106 of the first communication device 100 are integrated in one chipset.

According to embodiments of the disclosure and with reference to FIGS. 1 and 5, the first communication device 100 is configured to determine a DMRS sequence based on a cover code in a set of cover codes. The first communication device 100 is further configured to determine a DMRS by mapping the DMRS sequence onto one or more PRBs. The cover code is dependent on a DMRS antenna port index, and cover codes in the set of cover codes are orthogonal to each other in each PRB and a maximum correlation power between two cover codes in the set of cover codes is larger than 0 in each half PRB. The first communication device 100 is further configured to transmit the DMRS via a DMRS antenna port having DMRS antenna port index to a second communication device 300.

Figure 2:
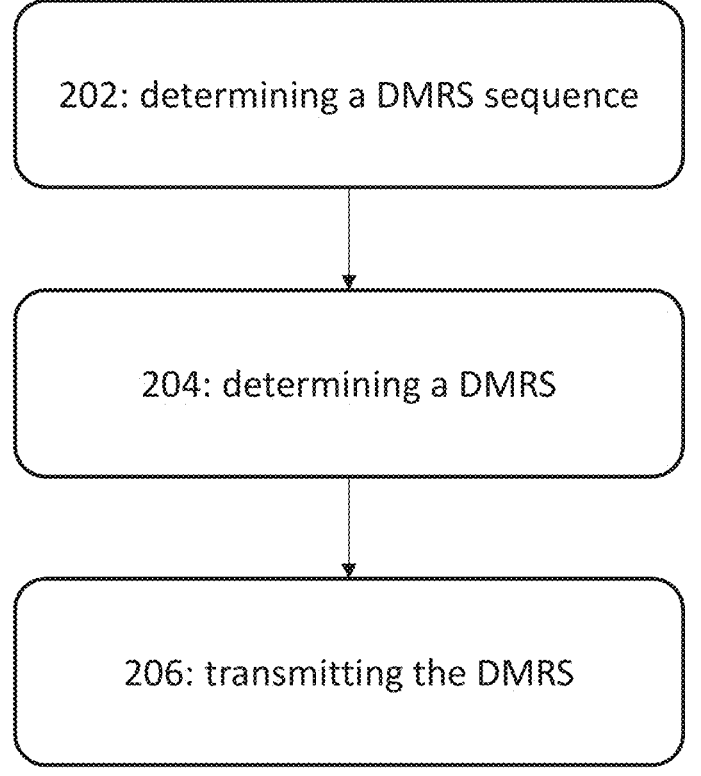
FIG. 2 shows a method for a first communication device according to an embodiment of the disclosure.

FIG. 2 shows a flow chart of a corresponding method 200 which may be executed in a first communication device 100, such as the one shown in FIG. 1. The method 200 comprises determining 202 a DMRS sequence based on a cover code in a set of cover codes. The method 200 further comprises determining 204 a DMRS by mapping the DMRS sequence onto one or more PRBs. The cover code is dependent on a DMRS antenna port index, and cover codes in the set of cover codes are orthogonal to each other in each PRB and a maximum correlation power between two cover codes in the set of cover codes is larger than 0 in each half PRB. The method 200 further comprises transmitting 206 the DMRS via a DMRS antenna port having DMRS antenna port index to a second communication device 300.

Figure 3:
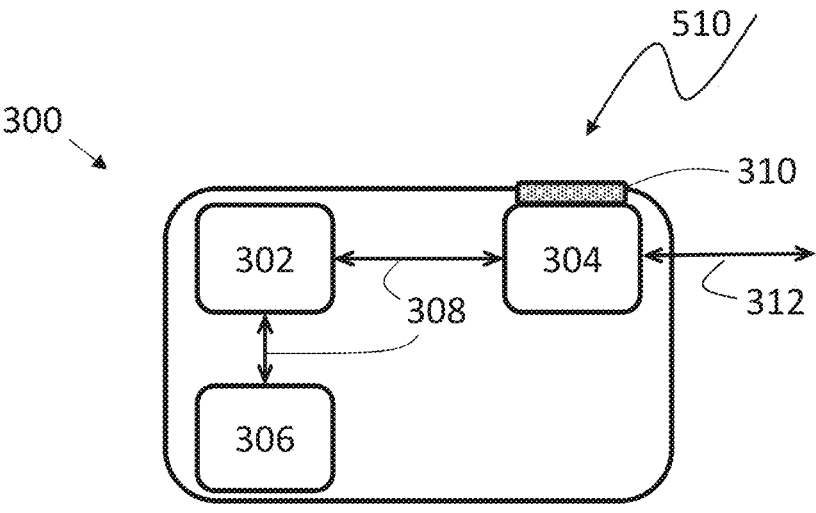
FIG. 3 shows a second communication device according to an embodiment of the disclosure.

FIG. 3 shows a second communication device 300 according to an embodiment of the disclosure. In the embodiment shown in FIG. 3, the second communication device 300 comprises a processor 302, a transceiver 304 and a memory 306. The processor 302 is coupled to the transceiver 304 and the memory 306 by communication means

308 known in the art. The second communication device 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304. That the second communication device 300 is configured to perform certain actions can in this disclosure be understood to mean that the second communication device 300 comprises suitable means, such as e.g. the processor 302 and the transceiver 304, configured to perform said actions.

The processor 302 of the second communication device 300 may be referred to as one or more general-purpose CPUs, one or more DSPs, one or more ASICs, one or more FPGAs, one or more programmable logic devices, one or more discrete gates, one or more transistor logic devices, one or more discrete hardware components, and one or more chipsets. The memory 306 of the second communication device 300 may be a read-only memory, a random access memory, or a NVRAM. The transceiver 304 of the second communication device 300 may be a transceiver circuit, a power controller, an antenna, or an interface which communicates with other modules or devices. In embodiments, the transceiver 304 of the second communication device 300 may be a separate chipset or being integrated with the processor 302 in one chipset. While in some embodiments, the processor 302, the transceiver 304, and the memory 306 of the second communication device 300 are integrated in one chipset.

According to embodiments of the disclosure and with reference to FIGS. 3 and 5, the second communication device 300 is configured to receive DMRS and associated data signal on one or more PRBs from a first communication device 100. The second communication device 300 is further configured to determine a DMRS sequence based on a cover code in a set of cover codes. The cover code is dependent on a DMRS antenna port index, and the cover codes in the set of cover codes are orthogonal to each other in each PRB, and a maximum correlation power between two cover codes in the set of cover codes is larger than 0 in each half PRB. The second communication device 300 is further configured to demodulate the associated data signal based on the received DMRS and the DMRS sequence.

Figure 4:
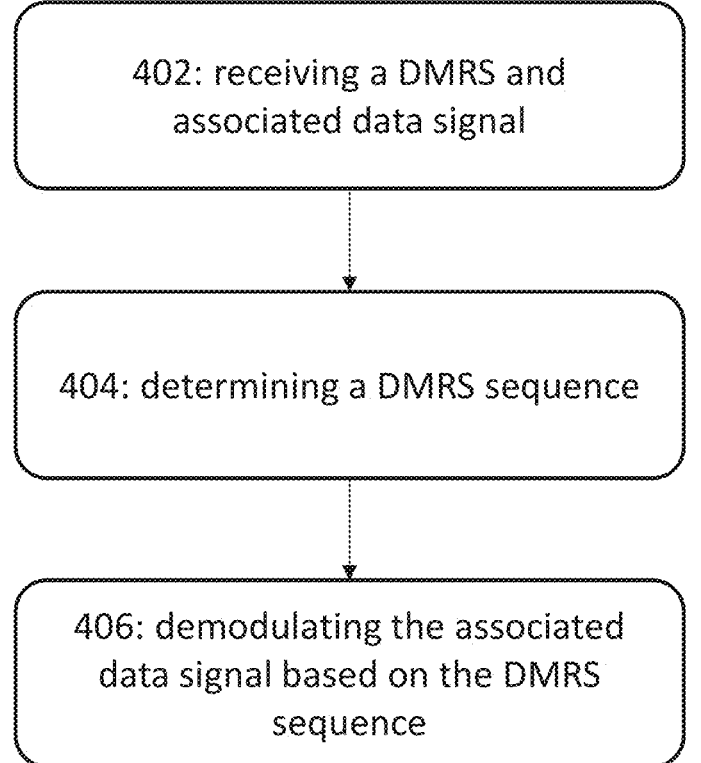
FIG. 4 shows a method for a second communication device according to an embodiment of the disclosure.

FIG. 4 shows a flow chart of a corresponding method 400 which may be executed in a second communication device 300, such as the one shown in FIG. 3. The method 400 comprises receiving 402 DMRS and associated data signal on one or more PRBs from a first communication device 100. The method 400 further comprises determining 404 a DMRS sequence based on a cover code in a set of cover codes. The cover code is dependent on a DMRS antenna port index, and the cover codes in the set of cover codes are orthogonal to each other in each PRB, and a maximum correlation power between two cover codes in the set of cover codes is larger than 0 in each half PRB. The method 400 further comprises demodulating 406 the associated data signal based on the received DMRS and the DMRS sequence.

Generally according to embodiments of the disclosure, by denoting by $b_q(n)$ ($n=0, 1, \ldots 2N_{PN}-1$, $q=0, 1, \ldots, 11$) the new DMRS sequences mapped on OFDM symbols $l_0$ and $l_1$, the proposed new DMRS sequences in this disclosure are expressed by $$b_q(n)=B_q(n){\cdot}C(n) \tag{5a}$$

where $$B_q(n) =$$

$$(-1)^{\lfloor \frac{n}{2} \rfloor} e^{j\left(((n+1)mod\,2)\alpha_{\lfloor \frac{n}{4} \rfloor} + (n\,mod\,2)\beta_{\lfloor \frac{n}{4} \rfloor}\right)} \cdot w_{q\,mod\,2}(n\,mod\,2)w_{\lfloor \frac{q}{6} \rfloor}\left(\left\lfloor \frac{n}{N_{PN}} \right\rfloor\right) \quad (5b)$$

is a new cover code and $$C(n) = c_{i_0 + \lfloor \frac{n}{N_{PN}} \rfloor (i_1 - i_0)}(n\,mod\,N_{PN}) \quad (5c)$$

is the same base sequence as given in Eq. (3c), with $w_0(0)=1$, $w_0(1)=1$, $w_1(0)=1$, $w_1(1)=-1$, and $\alpha_u, \beta_u \in [0, 2\pi)$ being two arbitrary real numbers for $$u = 0, 1, \cdots, \frac{N_{PN}}{2} - 1.$$

In a typical case, we have $l_1 - l_0 = 1$. Consequently, the new DMRS sequences can be implemented by using the new cover code $B_q(n)$ with the same base sequence $C(n)$ used for legacy NR DMRS sequences.

In embodiments of the disclosure, the segment of the new cover code $B_q(n)$ that is used on each PRB u $$\left( u = 0, 1, \ldots, \frac{N_{PN}}{4} - 1 \right)$$

and two OFDM symbols can written into a matrix form as $$\begin{bmatrix} e^{j\alpha_u} w_{q\,mod\,2}(0)w_{\lfloor \frac{q}{6} \rfloor}(0) & e^{j\alpha_{u+\frac{N_{PN}}{4}}} w_{q\,mod\,2}(0)w_{\lfloor \frac{q}{6} \rfloor}(1) \\ e^{j\beta_u} w_{q\,mod\,2}(1)w_{\lfloor \frac{q}{6} \rfloor}(0) & e^{j\beta_{u+\frac{N_{PN}}{4}}} w_{q\,mod\,2}(1)w_{\lfloor \frac{q}{6} \rfloor}(1) \\ -e^{j\alpha_u} w_{q\,mod\,2}(0)w_{\lfloor \frac{q}{6} \rfloor}(0) & -e^{j\alpha_{u+\frac{N_{PN}}{4}}} w_{q\,mod\,2}(0)w_{\lfloor \frac{q}{6} \rfloor}(1) \\ -e^{j\beta_u} w_{q\,mod\,2}(1)w_{\lfloor \frac{q}{6} \rfloor}(0) & -e^{j\beta_{u+\frac{N_{PN}}{4}}} w_{q\,mod\,2}(1)w_{\lfloor \frac{q}{6} \rfloor}(1) \end{bmatrix} \quad (6)$$

which is used to cover the sequence elements mapped on the REs with the following RE and OFDM symbol index pairs $$\begin{bmatrix} \left( 12u + 2\left\lfloor \frac{q\,mod\,6}{2} \right\rfloor, l_0 \right) & \left( 12u + 2\left\lfloor \frac{q\,mod\,6}{2} \right\rfloor, l_1 \right) \\ \left( 12u + 2\left\lfloor \frac{q\,mod\,6}{2} \right\rfloor + 1, l_0 \right) & \left( 12u + 2\left\lfloor \frac{q\,mod\,6}{2} \right\rfloor + 1, l_1 \right) \\ \left( 12u + 2\left\lfloor \frac{q\,mod\,6}{2} \right\rfloor + 6, l_0 \right) & \left( 12u + 2\left\lfloor \frac{q\,mod\,6}{2} \right\rfloor + 6, l_1 \right) \\ \left( 12u + 2\left\lfloor \frac{q\,mod\,6}{2} \right\rfloor + 7, l_0 \right) & \left( 12u + 2\left\lfloor \frac{q\,mod\,6}{2} \right\rfloor + 7, l_1 \right) \end{bmatrix}$$

Hence, at least one cover code in the set of cover codes in each PRB is given by the above formula (i.e. Eq. 6) where q is determined by the DMRS antenna port index, and $\alpha_u, \beta_u, \lambda_u, \rho_u$ are real numbers for PRB index u where u is an integer equal to or larger than 0 and $w_0(0)=1$, $w_0(1)=1$, $w_1(0)=1$, $w_1(1)=-1$.

Furthermore, in embodiments the cover code $B_q(n)$ can be a combination of a time domain cover code and a frequency domain cover code for the case when the following relation holds $$\alpha_u + \beta_{u+\frac{N_{PN}}{4}} = \beta_u + \alpha_{u+\frac{N_{PN}}{4}}.$$

Equation (5a) can be written into an equivalent expression as $$b_q(n) = B'(n) \cdot A_q(n) \cdot C(n) \quad (7)$$

where $$B'(n) = B_q(n)A_q^*(n) = (-1)^{\lfloor \frac{n}{2} \rfloor} e^{j\left(((n+1)mod\,2)\alpha_{\lfloor \frac{n}{4} \rfloor} + (n\,mod\,2)\beta_{\lfloor \frac{n}{4} \rfloor}\right)} \quad (8)$$

Equation (7) therefore implies three alternative implementations of the proposed new DMRSs.

In a first alternative embodiment, the new DMRS sequence can be implemented by using a cover code B'(n) on the legacy NR DMRS sequence $a_q(n)$ (i.e., $b_q(n)=B'(n)a_q(n)$). In this case, the segment of the addition cover code mapped on each PRB u $$\left( u = 0, 1, \cdots \frac{N_{PN}}{4} - 1 \right)$$

and two OFDM symbols can written into a matrix form as $$\begin{bmatrix} e^{j\alpha_u} & e^{j\alpha_{u+\frac{N_{PN}}{4}}} \\ e^{j\beta_u} & e^{j\beta_{u+\frac{N_{PN}}{4}}} \\ -e^{j\alpha_u} & -e^{j\alpha_{u+\frac{N_{PN}}{4}}} \\ -e^{j\beta_u} & -e^{j\beta_{u+\frac{N_{PN}}{4}}} \end{bmatrix} \quad (9)$$

which is used to cover the sequence elements mapped on the same REs as those for Eq. (6). In this case, we can call B'(n) as cover code on legacy DMRS sequences. Hence, at least one cover code in the set of cover codes in each PRB is given by the above formula (i.e. Eq. 9) where $\alpha_u, \beta_u, \lambda_u, \rho_u$ are real numbers for PRB index u where u is an integer equal to or larger than 0. The DMRS sequence is obtained based on the at least one cover code and a DMRS sequence associated with an another DMRS antenna port index.

Also, the cover code B'(n) can in embodiments be a combination of a time domain cover code and a frequency domain cover code for the case when the following relation holds:

$$\alpha_u + \beta_{u+\frac{N_{PN}}{4}} = \beta_u + \alpha_{u+\frac{N_{PN}}{4}}.$$

In a second alternative embodiment, the new DMRS sequence can be implemented by using a cover code $B_q(n)$ on the legacy base sequence $C(n)$, where the $B_q(n)$ is generated based on an additional cover code B'(n) and the legacy orthogonal cover code $A_q(n)$ (i.e., $b_q(n)=B_q(n) \cdot C(n)= B'(n)A_q(n) \cdot C(n)$). In this case, the segment of the additional cover code B'(n) mapped on each PRB u $$\left(u = 0, 1, \cdots \frac{N_{PN}}{4} - 1\right)$$

and two OFDM symbols can written into a matrix form as $$\begin{bmatrix} e^{j\alpha_u} & e^{j\alpha_{u+\frac{N_{PN}}{4}}} \\ e^{j\beta_u} & e^{j\beta_{u+\frac{N_{PN}}{4}}} \\ -e^{j\alpha_u} & -e^{j\alpha_{u+\frac{N_{PN}}{4}}} \\ -e^{j\beta_u} & -e^{j\beta_{u+\frac{N_{PN}}{4}}} \end{bmatrix} \tag{9A}$$

which is used to cover the legacy orthogonal cover code $A_q(n)$ elements mapped on the same REs as in legacy DMRS.

In a third alternative embodiment, the new DMRS sequence can be implemented by using an addition cover code B'(n) on the legacy base sequence C(n) (i.e., $b_q(n) = A_q(n) \cdot (B'(n)C(n))$). In this case, it is equivalent to use a new base sequence C'(n)=B'(n)C(n) with legacy cover code $A_q(n)$.

Noting that the legacy 12 NR DMRSs are mapped on 3 orthogonal frequency resources, if the 12 new DMRSs are also mapped to the same 3 orthogonal frequency resources as the 12 NR DMRSs, the target can be simplified to the design of 4 new DMRS $b_q(n)$ besides the 4 legacy NR DMRS $a_p(n)$ in each of the 3 orthogonal frequency resources. For simplicity, we focus on the first orthogonal frequency resource, where the port indexes for the 4 current NR DMRSs $a_p(n)$ are p=0,1,6,7 and the port indexes for the 4 new DMRSs $b_q(n)$ are q=0,1,6,7, respectively.

Similar to Eq. (4), the new DMRSs according to Eq. (5a) should have the same property as the legacy NR DMRSs and are mutually orthogonal to each other in every half-PRB and the two OFDM symbols, i.e., $$\Sigma_{n=0}^{1} b_p(2v+n)b_q*(2v+n) + \Sigma_{n=0}^{1} b_p(2v+N_{NP}+n)b_q*(2v+N_{NP}+n)=0 \tag{10}$$

where $$\forall v = 0, 1, \ldots, \frac{N_{PN}}{2} - 1$$

and {p≠q, p, q∈ {0, 1, 6,7}.

Substituting Eq. (5a) into Eq. (10), we obtain $$\Sigma_{n=0}^{1} B_p(2v+n)B_q*(2v+n) + \Sigma_{n=0}^{1} B_p(2v+N_{NP}+n)B_q*(2v+N_{NP}+n)=0, \tag{11}$$

where $$\forall v = 0, 1, \ldots, \frac{N_{PN}}{2} - 1$$

and $\forall$p≠q, p, q∈ {0,1, 6,7}. Equation (10) implies that the matrix $$\begin{pmatrix} B_0(2v) & B_1(2v) & B_6(2v) & B_7(2v) \\ B_0(2v+1) & B_1(2v+1) & B_6(2v+1) & B_7(2v+1) \\ B_0(2v+N_{PN}) & B_1(2v+N_{PN}) & B_6(2v+N_{PN}) & B_7(2v+N_{PN}) \\ B_0(2v+ & B_1(2v+ & B_6(2v+ & B_7(2v+ \\ N_{PN}+1) & N_{PN}+1) & N_{PN}+1) & N_{PN}+1) \end{pmatrix} \tag{12}$$

should be a scaled 4×4 orthonormal matrix with unit-norm entries, which can be guaranteed if $$B_q(n)=B'(n) \cdot A_q(n) \tag{13}$$

where B'(n) serves as the additional cover code with |B'(n)|=1 for $\forall$q=0, 1, 6, 7, and n=0, 1, . . . , $2N_{PN}$−1 and $A_q(n)$ is given in Eq. (3b), such that the matrix in Eq. (12) is obtained from the 4×4 Hadamard matrix with certain phase rotation on each row.

Under the structure in Eq. (13), we will provide the sufficient and necessary condition of new DMRS being orthogonal with legacy NR DMRS in each PRB as follow.

According to the design target, all the 8 DMRSs should be orthogonal within each PRB and the two OFDM symbols, i.e., $$\Sigma_{n=0}^{3} a_p(4u+n)b_q*(4u+n) + \Sigma_{n=0}^{3} a_p(4u+N_{NP}+n)b_q(4u+N_{NP}+n)=0 \tag{14}$$

where u=0,1, . . . , $N_{PR}B$−1, p, q∈ {0,1,6,7}. By substituting Eq. (3a), (5a) and (13) into (14), we can obtain $$\Sigma_{n=0}^{3} a_p*(4u+n)b_q(4u+n) + \Sigma_{n=0}^{3} a_p*(4u+N_{NP}+n)b_q(4u+N_{NP}+n) = \Sigma_{n=0}^{3} A_p(4u+n)B'(4u+n)A_q(4u+n)+\Sigma_{n=0}^{3} A_p(4u+N_{NP}+n)B'(4u+N_{NP}+n)A_q(4u+N_{NP}+n)=0 \tag{15}$$

which can be further simplified as $$\begin{cases} \sum_{n=0}^{3} B'(4u+n) = 0 \\ \sum_{n=0}^{3} (-1)^n B'(4u+n) = 0 \end{cases}, u = 0, 1, \ldots, 2N_{PRB} - 1 \tag{16}$$

Equation (16) serves as the sufficient and necessary condition for the new DMRS solutions. Its proof can be found in the Appendix.

We thus have the following general expression of the new DMRS sequences {$b_q(n)$} that can maintain orthogonality within each PRB with both each other and the legacy NR DMRS sequences $$b_q(n)=B_q(n) \cdot C(n), \tag{17a}$$

where $$B_q(n) = \tag{17b}$$

$$(-1)^{\lfloor \frac{n}{2} \rfloor} e^{j((n+1)mod\ 2)\alpha\lfloor \frac{n}{4} \rfloor + (n\ mod\ 2)\beta\lfloor \frac{n}{4} \rfloor)} \cdot w_{q\ mod\ 2}(n\ mod\ 2)w_{\lfloor \frac{q}{6} \rfloor}\left(\lfloor \frac{n}{N_{PN}} \rfloor\right).$$

and $$C(n) = c_{i_0 + \lfloor \frac{n}{N_{PN}} \rfloor (i_1 - i_0)}(n\ mod\ N_{PN}) \tag{17c}$$

and with n=0, 1, . . . $2N_{PN}$−1, q=0, 1, . . . , 11, $w_O(0)=1$, $w_0(1)=1$, $w_1(0)=1$, $w_1(1)=-1$, and $\alpha_u, \beta_u \in [0, 2\pi)$ being two arbitrary real numbers for $$u = 0, 1 \frac{N_{PN}}{2} - 1.$$

In the following, we will prove that Eq. (17) satisfies the design target of Eq. (16).

First, we rewrite Eq. (16) into a matrix form as $$[B'(4u)\ B'(4u+1)\ B'(4u+1)\ B'(4u+3)]\begin{bmatrix} 1 & 1 \\ 1 & -1 \\ 1 & 1 \\ 1 & -1 \end{bmatrix} = [0 \ 0], \tag{18}$$

$$u = 0, 1, \ldots, \frac{N_{PN}}{2} - 1$$

which implies $$\begin{bmatrix} B'(4u) \\ B'(4u+1) \\ B'(4u+2) \\ B'(4u+3) \end{bmatrix} = \begin{bmatrix} 1 & 1 \\ 1 & -1 \\ -1 & -1 \\ -1 & 1 \end{bmatrix} e_u \tag{19}$$

where $e_u$ is a length-2 vector. To further guarantee that the sequence $\{B'(n)\}$ has constant amplitude, the vector $e_u$ can be taken to have the following form $$e_u = \begin{bmatrix} e_u^{(0)} \\ e_u^{(1)} \end{bmatrix} = \begin{bmatrix} \left(e^{j\alpha_u} + e^{j\beta_u}\right)/2 \\ \left(e^{j\alpha_u} - e^{j\beta_u}\right)/2 \end{bmatrix} \tag{20}$$

where $\alpha_u$ and $\beta_u$ are two arbitrary real numbers. Since $e^{jt} = e^{j(t \bmod 2\pi)}$ for any real number t, we can assume $\alpha_u$ and $\beta_u \in [0, 2\pi)$, but it should be noted that they can be any real numbers in this disclosure. Substituting Eq. (20) into (19), we have $$\begin{bmatrix} B'(4u) \\ B'(4u+1) \\ B'(4u+2) \\ B'(4u+3) \end{bmatrix} = \begin{bmatrix} e^{j\alpha_u} \\ e^{j\beta_u} \\ -e^{j\alpha_u} \\ -e^{j\beta_u} \end{bmatrix}. \tag{21}$$

or equivalently $$B'(n) = (-1)^{\lfloor \frac{n}{2} \rfloor} e^{j\left((n+1 \bmod 2)\alpha_{\lfloor \frac{n}{4} \rfloor} + (n \bmod 2)\beta_{\lfloor \frac{n}{4} \rfloor}\right)}, \tag{22}$$

$$n = 0, 1, \ldots, 2N_{PN} - 1.$$

Further substituting Eq. (22) into (13), we can obtain (17b), which completes the proof.

It should be noticed that the cover code $B_q(n)$ can be a combination of a time domain cover code and a frequency domain cover code for the case when the following relation holds $$\alpha_u + \beta_{u+\frac{N_{PN}}{4}} = \beta_u + \alpha_{u+\frac{N_{PN}}{4}}.$$

The time domain cover code is a length-2 sequence $$t = \left[c_1 w_{\lfloor \frac{q}{6} \rfloor}(0), c_2 w_{\lfloor \frac{q}{6} \rfloor}(1),\right.$$

and the frequency domain cover code is a length-4 sequence $f = [d_1 w_{q \bmod 2}(0), d_2 w_{q \bmod 2}(1), -d_1 w_{q \bmod 2}(0), -d_2 w_{q \bmod 2}(1)]$, where $c_1 d_1 = e^{j\alpha_u}$, $c_1 d_2 = e^{j\beta_u}$, $$c_2 d_1 = e^{j\alpha_{u+\frac{N_{PN}}{4}}},$$

for the u-th PRB.

The additional cover code B'(n) can be a combination of a time domain additional cover code and a frequency domain additional cover code for the case $$\alpha_u + \beta_{u+\frac{N_{PN}}{4}} = \beta_u + \alpha_{u+\frac{N_{PN}}{4}}.$$

The time domain additional cover code is a length-2 sequence $t = [c_1, c_2]$, and the frequency domain additional cover code is a length-4 sequence $f = [d_1, d_2, -d_1, -d_2]$, where $c_1 d_1 = e^{j\alpha_u}$, $c_1 d_2 = e^{j\beta_u}$, $$c_2 d_1 = e^{j\alpha_{u+\frac{N_{PN}}{4}}},$$

for the u-th PRB.

There are pairwise orthogonal 24 DMRS ports in total, including 12 NR legacy DMRS ports and 12 new DMRS ports. All of the 24 DMRS ports with antenna port indexes 1000, 1001, . . . , 1023 can be obtained by combining Eq. (3) and (17), where the DMRS sequence for port (p+1000), where p=0, 1, . . . , 23, is given by $$a_p(n) = B_p(n) \cdot C(n) \tag{23a}$$

where $$B_p(n) = \left(1 - \left\lfloor \frac{p}{12} \right\rfloor + \left\lfloor \frac{p}{12} \right\rfloor (-1)^{\lfloor \frac{n}{2} \rfloor} e^{j\left((n+1 \bmod 2)\alpha_{\lfloor \frac{n}{4} \rfloor} + (n \bmod 2)\beta_{\lfloor \frac{n}{4} \rfloor}\right)}\right). \tag{23b}$$

$$w_{p \bmod 2}(n \bmod 2) w_{\lfloor \frac{p \bmod 12}{6} \rfloor}\left(\left\lfloor \frac{n}{N_{PN}} \right\rfloor\right).$$

and $$C(n) = c_{l_0 + \left\lfloor \frac{n}{N_{PN}} \right\rfloor (l_1 - l_0)}(n \bmod N_{PN}) \tag{23c}$$

with n=0, 1, . . . $2N_{PN}-1$, p=0, 1, . . . , 23, $w_0(0)=1$, $w_0(1)=1$, $w_1(0)=1$, $w_1(1)=-1$, and $\alpha_u$, $\beta_u \in [0, 2\pi)$ being two arbitrary real numbers for $$u = 0, 1, \ldots, \frac{N_{PN}}{2} - 1.$$

In legacy NR, 12 legacy DMRSs are transmitted using 24 REs per PRB (i.e., 12 RBs/PRB and 2 OFDM symbols). So 24 (but no more) DMRS sequences can be constructed with mutual orthogonality in each PRB given the same number of resources, implying that one can construct 12 new DMRSs orthogonal to the legacy NR DMRS in each PRB without using more time-frequency resources. Hence the solution provided in this disclosure is optimum in the sense that one could not construct more orthogonal DMRS sequences using the same number of resources.

Figure 5A:
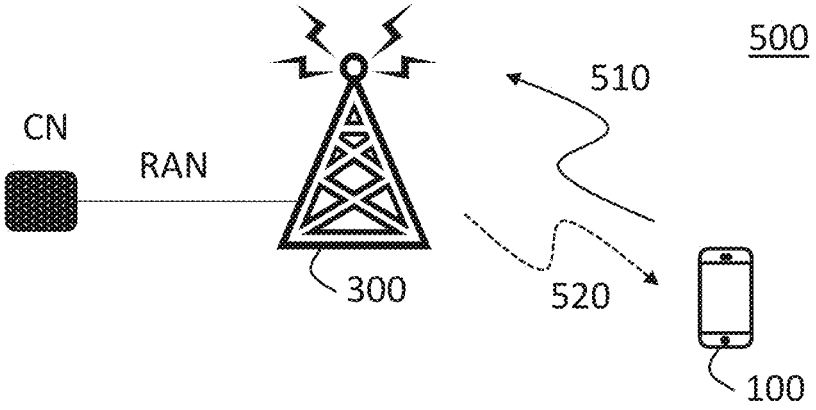
FIGS. 5a and 5b show a communication system according to an embodiment of the disclosure.
Figure 5B:
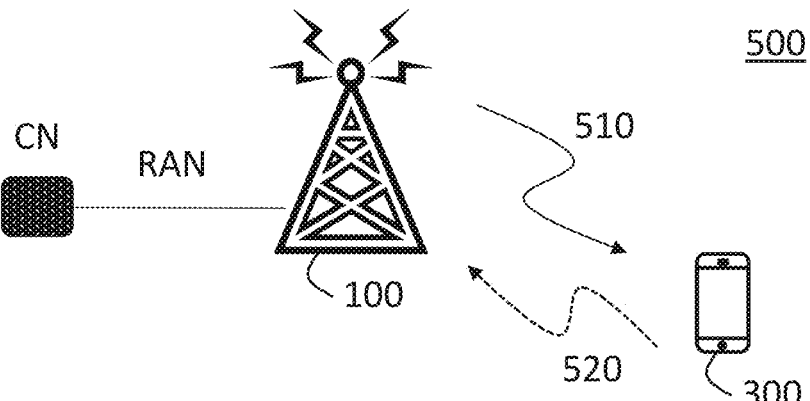

FIGS. 5a and 5b show a communication system 500 according to embodiments of the disclosure. The communication system 500 in this example comprises a first communication device 100 and a second communication device 300 configured to operate in the communication system 500 such as 5G NR. For simplicity, the communication system 500 shown only comprises one first communication device 100 and one second communication device 300. However, the wireless communication system 500 may comprise any number of first communication devices 100 and any number of second communication device 300 without deviating from the scope of the disclosure. In non-limiting examples, the first communication device 100 may be part of a client device and the second communication device 300 may be part of a network access node, or vice versa. The network access node may be part of a radio access network (RAN) coupled to a core network (CN). However, other system architecture is possible.

A client device in this disclosure includes but is not limited to: a UE such as a smart phone, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, an integrated access and backhaul node (IAB) such as mobile car or equipment installed in a car, a drone, a device-to-device (D2D) device, a wireless camera, a mobile station, an access terminal, an user unit, a wireless communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IoT) scenario, the client device 100 may represent a machine or another device or chipset which performs communication with another wireless device and/or a network equipment.

The UE may further be referred to as a mobile telephone, a cellular telephone, a computer tablet or laptop with wireless capability. The UE in this context may e.g. be portable, pocket-storable, hand-held, computer-comprised, or vehicle-mounted mobile device, enabled to communicate voice and/or data, via the radio access network, with another entity, such as another receiver or a server. The UE can be a station (STA), which is any device that contains an IEEE 802.11-conformant media access control (MAC) and physical layer (PHY) interface to the wireless medium (WM). The UE may also be configured for communication in 3GPP related LTE and LTE-Advanced, in WiMAX and its evolution, and in fifth generation wireless technologies, such as NR.

A network access node in this disclosure includes but is not limited to: a NodeB in wideband code division multiple access (WCDMA) system, an evolutional Node B (eNB) or an evolved NodeB (eNodeB) in LTE systems, or a relay node or an access point, or an in-vehicle device, a wearable device, or a gNB in the fifth generation (5G) networks. Further, the network access node herein may be denoted as a radio network access node, an access network access node, an access point, or a base station, e.g. a radio base station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a station (STA), which is any device that contains an IEEE 802.11-conformant MAC and PHY interface to the wireless medium. The radio network access node may also be a base station corresponding to the 5G wireless systems.

In FIG. 5a, the first communication device is part of a client device such as a UE, hence transmitting a DMRS and an associated data signal in UL wireless signal 510 to the second communication device 300. The latter being part of a network access node such as a BS.

It is to be noted that if the first communication device 100 is part of a client device the indicator(s) may be received in a downlink from a network access node such as the second communication device 300. If the second communication device 300 is part of a network access node, the indicators may be obtained from a memory, buffer, table, etc. in the network access node itself or in another network node. In this case the second communication device 300 may also be configured to transmit the indicators in the downlink to a client device such as the first communication device 100.

In FIG. 5b, the first communication device is instead part of a network access node. This implies that the wireless signal 510 is transmitted in the DL to the second communication device 300. The latter now being part of a client device.

If the first communication device 100 is part of a network access node, the indicators may be obtained from a memory, buffer, table, etc. in the network access node itself or in another network node. In this case the first communication device 100 may also be configured to transmit the indicators in the downlink to a client device such as the second communication device 300. It is to be noted that if the second communication device 300 is part of a client device the indicator(s) may be received in a downlink from a network access node such as the first communication device 100.

There are several different solutions to indicate the DMRS sequence and/or the cover code and/or the additional cover code according to embodiments of the disclosure. Hence, it is also disclosed signalling aspect of the present solution in which three non-limiting alternative embodiments will now be presented. In the set-up shown in FIG. 5a the standardized downlink control information (DCI) and higher signalling of 5G NR may be used. The DCI or the higher signalling is illustrated with the dashed arrow 520 in FIGS. 5a and 5b.

It should be note that the embodiments FIG. 5a and FIG. 5b may be independent on any other embodiments of the present disclose. The DCI, or DCI and higher layer signalling transmitting by the network access node or received by the client device may be independently operated. In this case, the first communication device 100 is configured to:

obtain a first indicator indicating at least one DMRS antenna port index between 0-23; or obtain a first indicator and a second indicator, wherein the first indicator indicates at least one DMRS antenna port index between 0-11 or 12-23, and the second indicator indicates whether the at least one DMRS antenna port index is between 0-11 or 12-23; or obtain a first indicator and a second indicator, wherein the first indicator indicates at least one DMRS antenna port index between 0-11, and the second indicator indicates any of the DMRS sequence, the cover code, or an additional cover code for the at least one DMRS antenna port index.

The following gives further detailed examples of the signalling design. It should be noted that the implementation of the signalling is only exemplary, and not restricted thereto.

In this case, the first indicator can be conveyed by DCI, the second indicator can be conveyed by DCI or higher layer signalling. The higher layer signalling can be radio resource control (RRC) signalling/information elements or media access control control element (MAC CE)

In a first alternative, the DMRS sequence and/or the cover code and/or the additional cover code are indicated by DMRS antenna port index from DCI, here some bits in the DCI are used to indicate the port index based on a relation between bits values and port indexes, e.g., the relation can be specified in a table. In other words, the first communication device 100 and/or the second communication device 300 may obtain a first indicator indicating at least one DMRS antenna port index between 0-23 or index 1000-1023 depending on the notation. The first indicator may be indicated or comprised in control signal 520.

In the first alternative, the relation between bits values and port indexes can be defined in a table or the like e.g. defined in a standard. In this table, each bit value may correspond to a number of DMRS CDM groups that cannot transmit data, a set of DMRS antenna ports and a number of front loaded DMRS symbols, and the table may be defined for one codeword case (the second codeword is not enabled) and/or two codewords case. In one example, different tables can be defined for different 'Transmission Configuration Indication' configurations.

The table may include at least one of the following features:

If more than one DMRS antenna port indexes are indicated, the corresponding DMRS antenna ports belong to the same DMRS CDM group, and all of them are newly defined DMRS antennas ports having DMRS antenna port index larger than 11;

If more than one DMRS antenna port indexes are indicated, the corresponding DMRS antenna ports belong to the same DMRS CDM group. At least one of the antenna ports is a legacy DMRS antenna port (port index $p_i \in \{0, 1, \ldots, 11\}$) and the other one is new DMRS antenna port (port index $p_n \in \{12, 13, \ldots, 23\}$). The DMRS sequences correspond to these two DMRS antenna ports can have the same orthogonal cover code $A_p(n)$.

An example of such as table is given in Table 1. It should be noticed that the mapping between the column "Value represented by bits in DCI" and the other three columns including "Number of DMRS CDM group(s) without data", "DMRS port(s)" and "Number of front-load symbols" can be arbitrary. Further, one or more rows of the columns "Number of DMRS CDM group(s) without data", "DMRS port(s)" and "Number of front-load symbols" are protected by this disclosure.

TABLE 1

The relation between bits in DCI and indicated DMRS antenna ports.

| One codeword: Codeword 0 enabled, Codeword 1 disabled | | | | Two Codewords: Codeword 0 enabled, Codeword 1 enabled | | | |
|---|---|---|---|---|---|---|---|
| Value represented by bits in DCI | Number of DMRS CDM group(s) without data | DMRS port(s) | Number of front-load symbols | Value represented by bits in DCI | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | | | | |
| 7 | 2 | 0, 1 | 1 | 6 | 1 | 0, 1, 6, 12, 13 | 2 |
| 8 | 2 | 2, 3 | 1 | 7 | 1 | 0, 1, 6, 12, 13, 18 | 2 |
| 9 | 2 | 0-2 | 1 | 8 | 1 | 0, 1, 6, 7, 12, 13, 18 | 2 |
| 10 | 2 | 0-3 | 1 | 9 | 1 | 0, 1, 6, 7, 12, 13, 18, 19 | 2 |
| 11 | 3 | 0 | 1 | 10 | 2 | 12, 13, 14, 15, 18 | 2 |
| 12 | 3 | 1 | 1 | 11 | 2 | 12, 13, 14, 15, 18, 20 | 2 |
| 13 | 3 | 2 | 1 | 12 | 2 | 12, 13, 14, 15, 18, 19, 20 | 2 |
| 14 | 3 | 3 | 1 | 13 | 2 | 12, 13, 14, 15, 18, 19, 20, 21 | 2 |
| 15 | 3 | 4 | 1 | 14 | 2 | 0, 1, 6, 12, 13 | 2 |
| 16 | 3 | 5 | 1 | 15 | 2 | 0, 1, 6, 12, 13, 18 | 2 |
| 17 | 3 | 0, 1 | 1 | 16 | 2 | 0, 1, 6, 7, 12, 13, 18 | 2 |
| 18 | 3 | 2, 3 | 1 | 17 | 2 | 0, 1, 6, 7, 12, 13, 18, 19 | 2 |
| 19 | 3 | 4, 5 | 1 | 18 | 2 | 2, 3, 8, 14, 15 | 2 |
| 20 | 3 | 0-2 | 1 | 19 | 2 | 2, 3, 8, 14, 15, 20 | 2 |
| 21 | 3 | 3-5 | 1 | 20 | 2 | 2, 3, 8, 9, 14, 15, 20 | 2 |
| 22 | 3 | 0-3 | 1 | 21 | 2 | 2, 3, 8, 9, 14, 15, 20, 21 | 2 |
| 23 | 2 | 0, 2 | 1 | Rest bits | Reserved | Reserved | Reserved |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |

TABLE 1-continued

The relation between bits in DCI and indicated DMRS antenna ports.

| | One codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value represented by bits in DCI | Number of DMRS CDM group(s) without data | DMRS port(s) | Number of front-load symbols | Value represented by bits in DCI | Number of DMRS CDM group(s) without data | DMRS port(s) | Number of front-load symbols |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 3 | 12 | 2 | | | | |
| 59 | 3 | 13 | 2 | | | | |
| 60 | 3 | 14 | 2 | | | | |
| 61 | 3 | 15 | 2 | | | | |
| 62 | 3 | 16 | 2 | | | | |
| 63 | 3 | 17 | 2 | | | | |
| 64 | 3 | 18 | 2 | | | | |
| 65 | 3 | 19 | 2 | | | | |
| 66 | 3 | 20 | 2 | | | | |
| 67 | 3 | 21 | 2 | | | | |
| 68 | 3 | 22 | 2 | | | | |
| 69 | 3 | 23 | 2 | | | | |
| 70 | 3 | 12, 13 | 2 | | | | |
| 71 | 3 | 14, 15 | 2 | | | | |
| 72 | 3 | 16, 17 | 2 | | | | |
| 73 | 3 | 18, 19 | 2 | | | | |
| 74 | 3 | 20, 21 | 2 | | | | |
| 75 | 3 | 22, 23 | 2 | | | | |
| 76 | 3 | 12, 13, 18 | 2 | | | | |
| 77 | 3 | 14, 15, 20 | 2 | | | | |
| 78 | 3 | 16, 17, 22 | 2 | | | | |
| 79 | 3 | 12, 13, 18, 19 | 2 | | | | |
| 80 | 3 | 14, 15, 20, 21 | 2 | | | | |
| 81 | 3 | 16, 17, 22, 23 | 2 | | | | |
| 82 | 1 | 12 | 2 | | | | |
| 83 | 1 | 13 | 2 | | | | |
| 84 | 1 | 18 | 2 | | | | |
| 85 | 1 | 19 | 2 | | | | |
| 86 | 1 | 12, 13 | 2 | | | | |
| 87 | 1 | 18, 19 | 2 | | | | |
| 88 | 2 | 12, 13 | 2 | | | | |
| 89 | 2 | 14, 15 | 2 | | | | |
| 90 | 2 | 18, 19 | 2 | | | | |
| 91 | 2 | 20, 21 | 2 | | | | |
| 92 | 3 | 0, 12 | 2 | | | | |
| 93 | 3 | 1, 13 | 2 | | | | |
| 94 | 3 | 2, 14 | 2 | | | | |
| 95 | 3 | 3, 15 | 2 | | | | |
| 96 | 3 | 4, 16 | 2 | | | | |
| 97 | 3 | 5, 17 | 2 | | | | |
| 98 | 3 | 6, 18 | 2 | | | | |
| 99 | 3 | 7, 19 | 2 | | | | |
| 100 | 3 | 8, 20 | 2 | | | | |
| 101 | 3 | 9, 21 | 2 | | | | |
| 102 | 3 | 10, 22 | 2 | | | | |
| 103 | 3 | 11, 23 | 2 | | | | |
| 104 | 3 | 0, 1, 12 | 2 | | | | |

TABLE 1-continued

The relation between bits in DCI and indicated DMRS antenna ports.

| One codeword: Codeword 0 enabled, Codeword 1 disabled | | | | Two Codewords: Codeword 0 enabled, Codeword 1 enabled | | | |
|---|---|---|---|---|---|---|---|
| Value represented by bits in DCI | Number of DMRS CDM group(s) without data | DMRS port(s) | Number of front-load symbols | Value represented by bits in DCI | Number of DMRS CDM group(s) without data | DMRS port(s) | Number of front-load symbols |
| 105 | 3 | 2, 3, 14 | 2 | | | | |
| 106 | 3 | 4, 5, 16 | 2 | | | | |
| 107 | 3 | 0, 1, 12, 13 | 2 | | | | |
| 108 | 3 | 2, 3, 14, 15 | 2 | | | | |
| 109 | 3 | 4, 5, 16, 17 | 2 | | | | |
| 110 | 3 | 6, 7, 18, 19 | 2 | | | | |
| 111 | 3 | 8, 9, 20, 21 | 2 | | | | |
| 112 | 3 | 10, 11, 22, 23 | 2 | | | | |
| 113 | 1 | 0, 12 | 2 | | | | |
| 114 | 1 | 1, 13 | 2 | | | | |
| 115 | 1 | 6, 18 | 2 | | | | |
| 116 | 1 | 7, 19 | 2 | | | | |
| 117 | 2 | 0, 12 | 2 | | | | |
| 118 | 2 | 1, 13 | 2 | | | | |
| 119 | 2 | 2, 14 | 2 | | | | |
| 120 | 2 | 3, 15 | 2 | | | | |
| 121 | 2 | 6, 18 | 2 | | | | |
| 122 | 2 | 7, 19 | 2 | | | | |
| 123 | 2 | 8, 20 | 2 | | | | |
| 124 | 2 | 9, 21 | 2 | | | | |
| Rest bits | Reserved | Reserved | Reserved | | | | |

In a second alternative, the DMRS sequence and/or the cover code and/or the additional cover code are indicated by DMRS antenna port index with two set of bit(s), where the first set of bits, carried in the DCI, indicate a number $p_1$ ($p_1 \in \{0, 1, \ldots, 11\}$), and the second set of bits can be one bit, carried in DCI or higher layer signaling, to indicate whether the port index is $p_1+12$ or $p_1$, e.g., the extra bit value "0" corresponds to $p_1$ and "1" corresponds to $p_1+12$. In other words, the first communication device 100 and/or the second communication device 300 may obtain a first indicator and a second indicator, where the first indicator pt indicates at least one DMRS antenna port index between 0-11 or 12-23, and the second indicator indicates whether the at least one DMRS antenna port index is between 0-11 or 12-23. The first indicator may be represented by the first set of bits and the second indicator may be represented by the second set of bits.

In the second alternative, the bits indicating pt can be the bits representing "Antenna port(s)" or "Antenna ports" in DCI. The extra bit can be one bit in DCI, e.g., one reserved bit in DCI in NR release 15 or in higher layer signalling. The higher layer signalling can be radio resource control (RRC) signalling/information elements or media access control control element (MAC CE).

In a third alternative, the DMRS sequence and/or the cover code and/or the additional cover code are indicated by DMRS antenna port index and one extra bit, where some bits, carried in the DCI, indicate the DMRS antenna port index $p_1$ ($p_1 \in \{0, 1, \ldots, 11\}$), and one extra bit, carried in DCI or higher layer signaling, indicates the set of DMRS sequence or the cover code, or indicates the additional cover code. The DMRS sequence and/or the cover code is determined based on the $p_1$ from the set of DMRS sequence or the cover code. In other words, the first communication device 100 and/or the second communication device 300 may obtain a first indicator and a second indicator, where the first indicator indicates at least one DMRS antenna port index between 0-11, and the second indicator indicates any of the DMRS sequence, the cover code, or an additional cover code for the at least one DMRS antenna port index.

In the third alternative, the DMRS antenna port index is indicated by the bits representing "Antenna port(s)" or "Antenna ports" in DCI, which can be maximum 12 ports, i.e., within $\{0, 1, \ldots, 11\}$. One extra bit is to indicate one of two sets of DMRS sequences, one of two sets of cover codes, or whether an additional cover code is used. The sets of DMRS sequences or cover codes can be predefined in table(s). Then, the DMRS sequence is determined based on the DMRS antenna port index from the indicated set of DMRS sequences, or the cover code is determined based on the DMRS antenna port index from the indicated set of cover codes. The extra bit can be one bit in DCI, e.g., one reserved bit in DCI in NR release 15 or in higher layer signalling. The higher layer signalling can be RRC signalling/information elements or MAC CE.

It may be noticed that the DMRS antenna port indication method can be used for the DMRS sequences in this disclosure or can also be used for other DMRS sequence design that supports more than 12 DMRS ports. It may further be noticed that DMRS antenna port p also presents the antenna port index p+1000 for p=1, 2, . . . 23.

In an example, this solution can be used for the case when DMRS type is 2 and maximum number of front-load symbols is 2. In a further example, each DMRS CDM group may include 8 DMRS ports mapping on the same resources. For example, the 8 DMRS ports for the three CDM groups are $\{0,1,6,7,12,13,18,19\}$, $\{2,3,8,9,14,15,20,21\}$, $\{4,5,10,11, 16,17,22,23\}$.

Moreover, by using the general expression of the new DMRS sequences in Eq. (17), one can obtain different new DMRS sequences $b_q(n)$ by using different values of $\alpha_u$ and $\beta_u$, such as but not limited to the following embodiments. In each embodiment, several implementation methods are provided for the same new DMRS sequences $b_q(n)$. Note that in a typical case, we have $l_1-l_0=1$ for the following embodiments.

Embodiment 1

This embodiment can be obtained from Eq. (17) with $$\alpha_{\lfloor \frac{n}{4} \rfloor} = \beta_{\lfloor \frac{n}{4} \rfloor} = 0, \forall n = 0, 1, \ldots 2N_{PN} - 1.$$

In this case, Eq. (17) reduces to $$b_q(n) = B_q(n) \cdot C(n), n = 0, 1, \ldots 2N_{PN} - 1, q = 0, 1, \ldots, 11 \tag{24a}$$

where $$B_q(n) = (-1)^{\lfloor \frac{n}{2} \rfloor} \cdot w_{q \bmod 2}(n \bmod 2) w_{\lfloor \frac{q}{6} \rfloor}\left(\left\lfloor \frac{n}{N_{PN}} \right\rfloor\right) \tag{24b}$$

and $$C(n) = c_{l_0 + \lfloor \frac{n}{N_{PN}} \rfloor (l_1 - l_0)}(n \bmod N_{PN}) \tag{24c}$$

One implementation of this embodiment is to use $b_q(n)$ as DMRS sequences. Another implementation is to use $B_q(n)$ in Eq. (24b) as new cover code with the same base sequence $C(n)$ used for legacy NR DMRS sequences. In this case, the new cover code on each PRB u and two OFDM symbols can written into a matrix form as:

$$\begin{bmatrix} w_{q \bmod 2}(0) w_{\lfloor \frac{q}{6} \rfloor}(0) & w_{q \bmod 2}(0) w_{\lfloor \frac{q}{6} \rfloor}(1) \\ w_{q \bmod 2}(1) w_{\lfloor \frac{q}{6} \rfloor}(0) & w_{q \bmod 2}(1) w_{\lfloor \frac{q}{6} \rfloor}(1) \\ -w_{q \bmod 2}(0) w_{\lfloor \frac{q}{6} \rfloor}(0) & -w_{q \bmod 2}(0) w_{\lfloor \frac{q}{6} \rfloor}(1) \\ -w_{q \bmod 2}(1) w_{\lfloor \frac{q}{6} \rfloor}(0) & -w_{q \bmod 2}(1) w_{\lfloor \frac{q}{6} \rfloor}(1) \end{bmatrix}$$

Another implementation is to use $$B'(n) = (-1)^{\lfloor \frac{n}{2} \rfloor}$$

as additional cover code on NR legacy DMRS sequences $a_q(n)$ in Eq. (3a), NR legacy OCC $A_q(n)$ in Eq. (3b) or base sequence $C(n)$ in Eq. (3c). In this case, the additional cover code on each PRB u and two OFDM symbols can written into a matrix form as $$\begin{bmatrix} 1 & 1 \\ 1 & 1 \\ -1 & -1 \\ -1 & -1 \end{bmatrix}$$

Another implementation is to add a length-2 OCC code [1−1] to the NR legacy DMRS sequences $a_q(n)$ in Eq. (3a), NR legacy OCC $A_q(n)$ in Eq. (3b) or base sequence $C(n)$ in Eq. (3c) in the first and second halves of each PRB.

Yet another implementation is to use $$(-1)^{\lfloor \frac{n}{2} \rfloor} C(n)$$

as new base sequence, where n=0, 1, . . . , $2N_{PN}-1$.

Embodiment 2

This embodiment can be obtained from Eq. (17) with $$\alpha_{\lfloor \frac{n}{4} \rfloor} = \pi/2 \text{ and } \beta_{\lfloor \frac{n}{4} \rfloor} = \pi/2, \forall n = 0, 1, \ldots 2N_{PN} - 1.$$

In this case, Eq. (17) reduces to $$b_q(n) = B_q(n) \cdot C(n), n = 0, 1, \ldots 2N_{PN} - 1, q = 0, 1, \ldots, 11 \tag{25a}$$

where $$B_q(n) = j(-1)^{\lfloor \frac{n}{2} \rfloor} \cdot w_{q \bmod 2}(n \bmod 2) w_{\lfloor \frac{q}{6} \rfloor}\left(\left\lfloor \frac{n}{N_{PN}} \right\rfloor\right) \tag{25b}$$

and $$C(n) = c_{l_0 + \lfloor \frac{n}{N_{PN}} \rfloor (l_1 - l_0)}(n \bmod N_{PN}) \tag{25c}$$

One implementation is to use $b_q(n)$ as DMRS sequences. Another implementation is to use $B_q(n)$ in (25b) as new cover code. In this case, the new cover code on each PRB u and two OFDM symbols can written into a matrix form as $$\begin{bmatrix} jw_{q \bmod 2}(0) w_{\lfloor \frac{q}{6} \rfloor}(0) & jw_{q \bmod 2}(0) w_{\lfloor \frac{q}{6} \rfloor}(1) \\ jw_{q \bmod 2}(1) w_{\lfloor \frac{q}{6} \rfloor}(0) & jw_{q \bmod 2}(1) w_{\lfloor \frac{q}{6} \rfloor}(1) \\ -jw_{q \bmod 2}(0) w_{\lfloor \frac{q}{6} \rfloor}(0) & -jw_{q \bmod 2}(0) w_{\lfloor \frac{q}{6} \rfloor}(1) \\ -jw_{q \bmod 2}(1) w_{\lfloor \frac{q}{6} \rfloor}(0) & -jw_{q \bmod 2}(1) w_{\lfloor \frac{q}{6} \rfloor}(1) \end{bmatrix}$$

Another implementation is to use $$B'(n) = (-1)^{\lfloor \frac{n}{2} \rfloor}$$

as additional cover code on NR legacy DMRS sequences $a_q(n)$ in Eq. (3a), NR legacy OCC $A_q(n)$ in Eq. (3b) or base sequence $C(n)$ in Eq. (3c). In this case, the additional cover code on each PRB u and two OFDM symbols can written into a matrix form as $$\begin{bmatrix} j & j \\ j & j \\ -j & -j \\ -j & -j \end{bmatrix}$$

Another implementation is to add a length-2 OCC code [j−j] to the NR legacy DMRS sequences $a_q(n)$ in Eq. (3a), NR legacy OCC $A_q(n)$ in Eq. (3b) or base sequence $C(n)$ in Eq. (3c) in the first and second halves of each PRB.

Yet another implementation is to use $$j(-1)^{\lfloor \frac{n}{2} \rfloor} C(n)$$

as new base sequence, where n=0, 1, . . . , $2N_{PN}-1$. This embodiment is equivalent to further multiplying a constant j to Embodiment 1.

Embodiment 3

This embodiment can be obtained from Eq. (17) with $$\alpha_{\lfloor \frac{n}{4} \rfloor} = 0 \text{ and } \beta_{\lfloor \frac{n}{4} \rfloor} = \pi,$$

$\forall n=0, 1, \ldots 2N_{PN}-1$. In this case, Eq. (17) reduces to $$b_q(n)=B_q(n) \cdot C(n), n=0,1, \ldots 2N_{PN}-1, \; q=0,1, \ldots ,11 \quad (26a)$$

where $$B_q(n) = (-1)^{\lfloor \frac{n}{2} \rfloor + (n \bmod 2)} \cdot w_{q \bmod 2}(n \bmod 2) w_{\lfloor \frac{q}{6} \rfloor}\left(\left\lfloor \frac{n}{N_{PN}} \right\rfloor\right) \quad (26b)$$

and $$C(n) = c_{i_0 + \lfloor \frac{n}{N_{PN}} \rfloor (i_1 - i_0)}(n \bmod N_{PN}) \quad (26c)$$

One implementation is to use $b_q(n)$ as DMRS sequences. Another implementation is to use $B_q(n)$ in Eq. (26b) as new cover code. In this case, the new cover code on each PRB u and two OFDM symbols can written into a matrix form as $$\begin{bmatrix} w_{q \bmod 2}(0) w_{\lfloor \frac{q}{6} \rfloor}(0) & w_{q \bmod 2}(0) w_{\lfloor \frac{q}{6} \rfloor}(1) \\ -w_{q \bmod 2}(1) w_{\lfloor \frac{q}{6} \rfloor}(0) & -w_{q \bmod 2}(1) w_{\lfloor \frac{q}{6} \rfloor}(1) \\ -w_{q \bmod 2}(0) w_{\lfloor \frac{q}{6} \rfloor}(0) & -w_{q \bmod 2}(0) w_{\lfloor \frac{q}{6} \rfloor}(1) \\ w_{q \bmod 2}(1) w_{\lfloor \frac{q}{6} \rfloor}(0) & w_{q \bmod 2}(1) w_{\lfloor \frac{q}{6} \rfloor}(1) \end{bmatrix}$$

Another implementation is to use $$B'(n) = (-1)^{\lfloor \frac{n}{2} \rfloor + (n \bmod 2)}$$

as additional cover code on NR legacy DMRS sequences $a_q(n)$ in Eq. (3a), NR legacy OCC $A_q(n)$ in Eq. (3b) or base sequence $C(n)$ in Eq. (3c). In this case, the additional cover code on each PRB u and two OFDM symbols can written into a matrix form as $$\begin{bmatrix} 1 & 1 \\ -1 & -1 \\ -1 & -1 \\ 1 & 1 \end{bmatrix}$$

Another implementation is to add a length-4 OCC code $[1, -1, -1, 1]$ to the NR legacy DMRS sequences $a_q(n)$ in Eq. (3a), NR legacy OCC $A_q(n)$ in Eq. (3b) or base sequence $C(n)$ in Eq. (3c) in each PRB and each symbol.

Yet another implementation is to use $$(-1)^{\lfloor \frac{n}{2} \rfloor + (n \bmod 2)} C(n)$$

as new base sequence, where $n=0, 1, \ldots, 2N_{PN}-1$.

Embodiment 4

This embodiment can be obtained from Eq. (17) with $$\alpha_{\lfloor \frac{n}{4} \rfloor} = 0 \text{ and } \beta_{\lfloor \frac{n}{4} \rfloor} = \pi/2,$$

$\forall n=0, 1, \ldots 2N_{PN}-1$. In this case, Eq. (17) reduces to $$b_q(n)=B_q(n) \cdot C(n), n=0,1, \ldots 2N_{PN}-1, \; q=0,1, \ldots ,11 \quad (27a)$$

where $$B_q(n) = (-1)^{\lfloor \frac{n}{2} \rfloor j(n \bmod 2)} \cdot w_{q \bmod 2}(n \bmod 2) w_{\lfloor \frac{q}{6} \rfloor}\left(\left\lfloor \frac{n}{N_{PN}} \right\rfloor\right) \quad (27b)$$

and $$C(n) = c_{i_0 + \lfloor \frac{n}{N_{PN}} \rfloor (i_1 - i_0)}(n \bmod N_{PN}) \quad (27c)$$

One implementation is to use $b_q(n)$ as DMRS sequences. Another implementation is to use $B_q(n)$ in Eq. (27b) as new cover code. In this case, the new cover code on each PRB u and two OFDM symbols can written into a matrix form as $$\begin{bmatrix} w_{q \bmod 2}(0) w_{\lfloor \frac{q}{6} \rfloor}(0) & w_{q \bmod 2}(0) w_{\lfloor \frac{q}{6} \rfloor}(1) \\ j w_{q \bmod 2}(1) w_{\lfloor \frac{q}{6} \rfloor}(0) & j w_{q \bmod 2}(1) w_{\lfloor \frac{q}{6} \rfloor}(1) \\ -w_{q \bmod 2}(0) w_{\lfloor \frac{q}{6} \rfloor}(0) & -w_{q \bmod 2}(0) w_{\lfloor \frac{q}{6} \rfloor}(1) \\ -j w_{q \bmod 2}(1) w_{\lfloor \frac{q}{6} \rfloor}(0) & -j w_{q \bmod 2}(1) w_{\lfloor \frac{q}{6} \rfloor}(1) \end{bmatrix}$$

Another implementation is to use $$B'(n) = (-1)^{\lfloor \frac{n}{2} \rfloor j(n \bmod 2)}$$

as additional cover code on NR legacy DMRS sequences $a_q(n)$ in Eq. (3a), NR legacy OCC $A_q(n)$ in Eq. (3b) or base sequence $C(n)$ in Eq. (3c). In this case, the additional cover code on each PRB u and two OFDM symbols can written into a matrix form as $$\begin{bmatrix} 1 & 1 \\ j & j \\ -1 & -1 \\ -j & -j \end{bmatrix}$$

Another implementation is to add a length-4 OCC code $[1, j, -1, -j]$ to the NR legacy DMRS sequences $a_q(n)$ in Eq. (3a), NR legacy OCC $A_q(n)$ in Eq. (3b) or base sequence $C(n)$ in Eq. (3c) in each PRB and each symbol.

Yet another implementation is to use $$(-1)^{\lfloor \frac{n}{2} \rfloor + (n \bmod 2)} C(n)$$

as new base sequence, where $n=0, 1, \ldots, 2N_{PN}-1$.

Embodiment 5

This embodiment can be obtained from Eq. (17) with $$\alpha_{\lfloor \frac{n}{4} \rfloor} = 0 \text{ and } \beta_{\lfloor \frac{n}{4} \rfloor} = 3\pi/2,$$

$\forall n=0, 1, \ldots 2N_{PN}-1$. In this case, Eq. (17) reduces to $$b_q(n)=B_q(n)\cdot C(n), n=0,1, \ldots 2N_{PN}-1, q=0,1, \ldots, 11 \qquad (28a)$$

where $$B_q(n) = (-1)^{\lfloor \frac{n}{2} \rfloor} j^{3(n \bmod 2)} \cdot w_{q \bmod 2}(n \bmod 2) w_{\lfloor \frac{q}{6} \rfloor}\left( \left\lfloor \frac{n}{N_{PN}} \right\rfloor \right) \qquad (28b)$$

and $$C(n) = c_{i_0 + \lfloor \frac{n}{N_{PN}} \rfloor (i_1 - i_0)}(n \bmod N_{PN}) \qquad (28c)$$

One implementation is to use $b_q(n)$ as DMRS sequences. Another implementation is to use $B_q(n)$ in (28b) as new cover code. In this case, the new cover code on each PRB u and two OFDM symbols can written into a matrix form as $$\begin{bmatrix} w_{q \bmod 2}(0)w_{\lfloor \frac{q}{6} \rfloor}(0) & w_{q \bmod 2}(0)w_{\lfloor \frac{q}{6} \rfloor}(1) \\ -jw_{q \bmod 2}(1)w_{\lfloor \frac{q}{6} \rfloor}(0) & -jw_{q \bmod 2}(1)w_{\lfloor \frac{q}{6} \rfloor}(1) \\ -w_{q \bmod 2}(0)w_{\lfloor \frac{q}{6} \rfloor}(0) & -w_{q \bmod 2}(0)w_{\lfloor \frac{q}{6} \rfloor}(1) \\ jw_{q \bmod 2}(1)w_{\lfloor \frac{q}{6} \rfloor}(0) & jw_{q \bmod 2}(1)w_{\lfloor \frac{q}{6} \rfloor}(1) \end{bmatrix}$$

Another implementation is to use $$B'(n) = (-1)^{\lfloor \frac{n}{2} \rfloor} j^{3(n \bmod 2)}$$

as additional cover code on NR legacy DMRS sequences $a_q(n)$ in (3a), NR legacy OCC $A_q(n)$ in (3b) or base sequence $C(n)$ in Eq. (3c). In this case, the additional cover code on each PRB u and two OFDM symbols can written into a matrix form as $$\begin{bmatrix} 1 & 1 \\ -j & -j \\ -1 & -1 \\ j & j \end{bmatrix}$$

Another implementation is to add a length-4 OCC code $[1, -j, -1, j]$ to the NR legacy DMRS sequences $a_q(n)$ in Eq. (3a), NR legacy OCC $A_q(n)$ in Eq. (3b) or base sequence $C(n)$ in Eq. (3c) in each PRB and each symbol.

Yet another implementation is to use $$(-1)^{\lfloor \frac{n}{2} \rfloor} j^{3(n \bmod 2)} C(n)$$

as new base sequence, where $n=0, 1, \ldots, 2N_{PN}-1$.

An advantage of Embodiments 4 and 5 is that each new DMRS can keep a low correlation with each NR DMRS in every half RB and each OFDM symbol. The related correlation power can be as low as $\frac{1}{2}$, where the correlation power of two sequences x and y is $$\left( \frac{x^H y}{\|x\| \cdot \|y\|} \right)^2.$$

This can be guaranteed if $$\left| e^{j\alpha_u} + e^{j\alpha_{u+\frac{N_{PN}}{4}}} + e^{j\beta_u} + e^{j\beta_{u+\frac{N_{PN}}{4}}} \right|^2 = 8$$

for any u.

We can also implement different embodiments above in different OFDM symbols or implement the same or different embodiments above with different phase rotation in different OFDM symbols (phase rotation with any phase $\theta$ is equivalent to adding $\theta$ to both $\alpha_u$ and $\beta_u$). For example, by implementing Embodiment 2 in the first OFDM symbol $l=l_0$, and Embodiment 3 in the second OFDM symbol $l=l_1$, we can have the following Embodiment 6.

Embodiment 6

This embodiment can be obtained from Eq. (17) with $$\alpha_{\lfloor \frac{n}{4} \rfloor} = \pi/2, \beta_{\lfloor \frac{n}{4} \rfloor} = \pi/2,$$

$\forall n=0,1, \ldots N_{PN}-1$ and $$\alpha_{\lfloor \frac{n}{4} \rfloor} = 0, \beta_{\lfloor \frac{n}{4} \rfloor} = \pi,$$

$\forall n=N_{PN}, N_{PN}+1, \ldots 2N_{PN}-1$. In this case, Eq. (17) reduces to $$b_q(n)=B_q(n)\cdot C(n), n=0,1, \ldots 2N_{PN}-1, q=0,1, \ldots, 11 \qquad (29a)$$

where $$B_q(n) = j^{1-\lfloor \frac{n}{N_{PN}} \rfloor}(-1)^{\lfloor \frac{n}{2} \rfloor + \lfloor \frac{n}{N_{PN}} \rfloor (n \bmod 2)} \cdot w_{q \bmod 2}(n \bmod 2) w_{\lfloor \frac{q}{6} \rfloor}\left( \left\lfloor \frac{n}{N_{PN}} \right\rfloor \right) \qquad (29b)$$

and $$C(n) = c_{i_0 + \lfloor \frac{n}{N_{PN}} \rfloor (i_1 - i_0)}(n \bmod N_{PN}) \qquad (29c)$$

One implementation is to use $b_q(n)$ as DMRS sequences. Another implementation is to use $B_q(n)$ in Eq. (29b) as new cover code. In this case, the new cover code on each PRB u and two OFDM symbols can written into a matrix form as $$\begin{bmatrix} jw_{q \bmod 2}(0)w_{\lfloor \frac{q}{6} \rfloor}(0) & w_{q \bmod 2}(0)w_{\lfloor \frac{q}{6} \rfloor}(1) \\ jw_{q \bmod 2}(1)w_{\lfloor \frac{q}{6} \rfloor}(0) & -w_{q \bmod 2}(1)w_{\lfloor \frac{q}{6} \rfloor}(1) \\ -jw_{q \bmod 2}(0)w_{\lfloor \frac{q}{6} \rfloor}(0) & -jw_{q \bmod 2}(0)w_{\lfloor \frac{q}{6} \rfloor}(1) \\ -jw_{q \bmod 2}(1)w_{\lfloor \frac{q}{6} \rfloor}(0) & jw_{q \bmod 2}(1)w_{\lfloor \frac{q}{6} \rfloor}(1) \end{bmatrix}$$

Another implementation is to use $$B'(n) = j^{1-\lfloor \frac{n}{N_{PN}} \rfloor}(-1)^{\lfloor \frac{n}{2} \rfloor + \lfloor \frac{n}{N_{PN}} \rfloor (n \bmod 2)}$$

as additional cover code on NR legacy DMRS sequences $a_q(n)$ in Eq. (3a), NR legacy OCC $A_q(n)$ in Eq. (3b) or base sequence C(n) in Eq. (3c). In this case, the additional cover code on each PRB u and two OFDM symbols can written into a matrix form as $$\begin{bmatrix} j & 1 \\ j & -1 \\ -j & -1 \\ -j & 1 \end{bmatrix}$$

Yet another implementation is to use $$j^{1-\left\lfloor \frac{n}{N_{PN}} \right\rfloor}(-1)^{\left\lfloor \frac{n}{2} \right\rfloor + \left\lfloor \frac{n}{N_{PN}} \right\rfloor (n \bmod 2)} C(n)$$

as new base sequence, where $n=0, 1, \ldots, 2N_{PN}-1$.

An advantage of Embodiment 6 is that each new DMRS can keep a low correlation with each NR DMRS in every half RB in the two OFDM symbols. The related correlation power can be as low as $\frac{1}{4}$.

In another example, by implementing Embodiment 4 in the first OFDM symbol $l=l_0$ with a common phase rotation j, and Embodiment 4 in the second OFDM symbol $l=l_1$ without phase rogation, we can have the following Embodiment 7.

Embodiment 7

This embodiment can be obtained from Eq. (17) with $$\alpha_{\left\lfloor \frac{n}{4} \right\rfloor} = \pi/2, \beta_{\left\lfloor \frac{n}{4} \right\rfloor} = \pi,$$

$\forall n=0,1, \ldots N_{PN}-1$ and $$\alpha_{\left\lfloor \frac{n}{4} \right\rfloor} = 0, \beta_{\left\lfloor \frac{n}{4} \right\rfloor} = \frac{\pi}{2},$$

$\forall n=N_{PN}, N_P N_{PN}+1, \ldots, 2N_{PN}-1$. In this case, EQ. (17) reduces to $$b_q(n)=B_q(n)\cdot C(n), n=0,1, \ldots 2N_{PN}-1, q=0,1, \ldots ,11 \quad (30a)$$

where $$B_q(n) = (-1)^{\left\lfloor \frac{n}{2} \right\rfloor} j^{(n \bmod 2)+\left\lfloor \frac{n}{N_{PN}} \right\rfloor} \cdot w_{q \bmod 2}(n \bmod 2) w_{\left\lfloor \frac{q}{6} \right\rfloor}\left(\left\lfloor \frac{n}{N_{PN}} \right\rfloor\right) \quad (30b)$$

and $$C(n) = c_{i_0 + \left\lfloor \frac{n}{N_{PN}} \right\rfloor (i_1 - i_0)}(n \bmod N_{PN}) \quad (30c)$$

One implementation is to use $b_q(n)$ as DMRS sequences. Another implementation is to use $B_q(n)$ in Eq. (30b) as new cover code. In this case, the new cover code on each PRB u and two OFDM symbols can written into a matrix form as $$\begin{bmatrix} jw_{q \bmod 2}(0)w_{\left\lfloor \frac{q}{6} \right\rfloor}(0) & w_{q \bmod 2}(0)w_{\left\lfloor \frac{q}{6} \right\rfloor}(1) \\ -w_{q \bmod 2}(1)w_{\left\lfloor \frac{q}{6} \right\rfloor}(0) & jw_{q \bmod 2}(1)w_{\left\lfloor \frac{q}{6} \right\rfloor}(1) \\ -jw_{q \bmod 2}(0)w_{\left\lfloor \frac{q}{6} \right\rfloor}(0) & -w_{q \bmod 2}(0)w_{\left\lfloor \frac{q}{6} \right\rfloor}(1) \\ w_{q \bmod 2}(1)w_{\left\lfloor \frac{q}{6} \right\rfloor}(0) & -jw_{q \bmod 2}(1)w_{\left\lfloor \frac{q}{6} \right\rfloor}(1) \end{bmatrix}$$

Another implementation is to use $$B'(n) = (-1)^{\left\lfloor \frac{n}{2} \right\rfloor} j^{(n \bmod 2)+\left\lfloor \frac{n}{N_{PN}} \right\rfloor}$$

as additional cover code on NR legacy DMRS sequences $a_q(n)$ in Eq. (3a), NR legacy OCC $A_q(n)$ in Eq. (3b) or base sequence C(n) in Eq. (3c). In this case, the additional cover code on each PRB u and two OFDM symbols can written into a matrix form as $$\begin{bmatrix} j & 1 \\ -1 & j \\ -j & -1 \\ 1 & -j \end{bmatrix}$$

Yet another implementation is to use $$(-1)^{\left\lfloor \frac{n}{2} \right\rfloor} j^{(n \bmod 2)+\left\lfloor \frac{n}{N_{PN}} \right\rfloor} C(n)$$

as new base sequence, where $n=0, 1, \ldots, 2N_{PN}-1$.

An advantage of Embodiment 7 is that each new DMRS can keep a low correlation with each NR DMRS in every half RB both in each OFDM symbol and in the two OFDM symbols. The related correlation power in every half-PRB in each OFDM symbol can be as low as $\frac{1}{2}$, and the correlation power in every half-PRB in the two OFDM symbol can be as low as $\frac{1}{4}$.

In yet another example, by implementing Embodiment 5 in the first OFDM symbol $l=l_0$ with a common phase rotation j, and Embodiment 5 in the second OFDM symbol $l=l_1$ without phase rotation, we can have the following Embodiment 8.

Embodiment 8

This embodiment can be obtained from Eq. (17) with $$\alpha_{\left\lfloor \frac{n}{4} \right\rfloor} = \pi/2, \beta_{\left\lfloor \frac{n}{4} \right\rfloor} = 0,$$

$\forall n=0, 1, \ldots N_{PN}-1$ and $$\alpha_{\left\lfloor \frac{n}{4} \right\rfloor} = 0, \beta_{\left\lfloor \frac{n}{4} \right\rfloor} = \frac{3\pi}{2},$$

$\forall n=N_{PN}, N_{PN}+1, \ldots 2N_{PN}-1$. In this case, Eq. (17) reduces to $$b_q(n)=B_q(n)\cdot C(n), n=0,1, \ldots 2N_{PN}-1, q=0,1, \ldots ,11 \quad (31a)$$

where $$B_q(n) = (-1)^{\lfloor \frac{n}{2} \rfloor} j^{3(n \bmod 2) + \lfloor \frac{n}{N_{PN}} \rfloor} \cdot w_{q \bmod 2}(n \bmod 2) w_{\lfloor \frac{q}{6} \rfloor}\left(\left\lfloor \frac{n}{N_{PN}} \right\rfloor\right) \tag{31b}$$

and $$C(n) = c_{i_0 + \left\lfloor \frac{n}{N_{PN}} \right\rfloor (i_1 - i_0)}(n \bmod N_{PN}) \tag{31c}$$

One implementation is to use b (n) as DMRS sequences. Another implementation is to use $B_q(n)$ in Eq. (31b) as new cover code. In this case, the new cover code on each PRB u and two OFDM symbols can written into a matrix form as $$\begin{bmatrix} jw_{q \bmod 2}(0)w_{\lfloor \frac{q}{6} \rfloor}(0) & w_{q \bmod 2}(0)w_{\lfloor \frac{q}{6} \rfloor}(1) \\ w_{q \bmod 2}(1)w_{\lfloor \frac{q}{6} \rfloor}(0) & -jw_{q \bmod 2}(1)w_{\lfloor \frac{q}{6} \rfloor}(1) \\ -jw_{q \bmod 2}(0)w_{\lfloor \frac{q}{6} \rfloor}(0) & -w_{q \bmod 2}(0)w_{\lfloor \frac{q}{6} \rfloor}(1) \\ -w_{q \bmod 2}(1)w_{\lfloor \frac{q}{6} \rfloor}(0) & jw_{q \bmod 2}(1)w_{\lfloor \frac{q}{6} \rfloor}(1) \end{bmatrix}$$

Another implementation is to use $$B'(n) = (-1)^{\lfloor \frac{n}{2} \rfloor} j^{3(n \bmod 2) + \lfloor \frac{n}{N_{PN}} \rfloor}$$

as additional cover code on NR legacy DMRS sequences $a_q(n)$ in Eq. (3a), NR legacy OCC $A_q(n)$ in Eq. (3b) or base sequence C(n) in Eq. (3c). In this case, the additional cover code on each PRB u and two OFDM symbols can written into a matrix form as $$\begin{bmatrix} j & 1 \\ 1 & -j \\ -j & -1 \\ -1 & j \end{bmatrix}$$

Yet another implementation is to use $$(-1)^{\lfloor \frac{n}{2} \rfloor} j^{3(n \bmod 2) + \lfloor \frac{n}{N_{PN}} \rfloor} C(n)$$

as new base sequence, where $n = 0, 1, \ldots, 2N_{PN}-1$.

An advantage of Embodiment 8 is that each new DMRS can keep a low correlation with each NR DMRS in every half RB both in each OFDM symbol and in the two OFDM symbols. The related correlation power in every half-PRB in each OFDM symbol can be as low as ½, and the correlation power in every half-PRB in the two OFDM symbol can be as low as ¼. This can be guaranteed if $$\left| e^{j\alpha u} + e^{j\alpha}_{u + \frac{N_{PN}}{4}} + e^{j\beta u} + e^{j\beta}_{u + \frac{N_{PN}}{4}} \right|^2 = 4$$

for any u.

The above embodiments all have the same cover code in all PRBs. We can assign different cover codes to different PRBs, e.g., as in Embodiment 9 below.

Embodiment 9

This embodiment can be obtained from Eq. (12) with $$e^{j\alpha \lfloor \frac{n}{4} \rfloor} = c^*_{i_0 + \left\lfloor \frac{n}{N_{PN}} \right\rfloor (i_1 - i_0)}\left(4 \left\lfloor \frac{n \bmod N_{PN}}{4} \right\rfloor\right)$$

$$c^*_{i_0 + \left\lfloor \frac{n}{N_{PN}} \right\rfloor (i_1 - i_0)}\left(4 \left\lfloor \frac{n \bmod N_{PN}}{4} \right\rfloor + 2\right) \cdot e^{j\beta \lfloor \frac{n}{4} \rfloor} =$$

$$c^*_{i_0 + \left\lfloor \frac{n}{N_{PN}} \right\rfloor (i_1 - i_0)}\left(4 \left\lfloor \frac{n \bmod N_{PN}}{4} \right\rfloor + 1\right) c^*_{i_0 + \left\lfloor \frac{n}{N_{PN}} \right\rfloor (i_1 - i_0)}\left(4 \left\lfloor \frac{n \bmod N_{PN}}{4} \right\rfloor + 3\right),$$

$$\forall n = 0, 1 \ldots 2N_{PN} -$$

1. In this case, Eq. (17) reduces to $$b_q(n) = B_q(n) \cdot C(n), n = 0, 1, \ldots 2N_{PN}-1, q = 0, 1, \ldots, 11 \tag{32a}$$

where $$B_q(n) = (-1)^{\lfloor \frac{n}{2} \rfloor}\Bigg(((n+1) \bmod 2) \tag{32b}$$

$$c^*_{i_0 + \left\lfloor \frac{n}{N_{PN}} \right\rfloor (i_1 - i_0)}\left(\left\lfloor \frac{n \bmod N_{PN}}{4} \right\rfloor\right) c^*_{i_0 + \left\lfloor \frac{n}{N_{PN}} \right\rfloor (i_1 - i_0)}\left(\left\lfloor \frac{n \bmod N_{PN}}{4} \right\rfloor + 2\right) +$$

$$(n \bmod 2) c^*_{i_0 + \left\lfloor \frac{n}{N_{PN}} \right\rfloor (i_1 - i_0)}\left(\left\lfloor \frac{n \bmod N_{PN}}{4} \right\rfloor + 1\right)$$

$$c^*_{i_0 + \left\lfloor \frac{n}{N_{PN}} \right\rfloor (i_1 - i_0)}\left(\left\lfloor \frac{n \bmod N_{PN}}{4} \right\rfloor + 3\right)\Bigg) \cdot w_{q \bmod 2}(n \bmod 2) w_{\lfloor \frac{q}{6} \rfloor}\left(\left\lfloor \frac{n}{N_{PN}} \right\rfloor\right)$$

and $$C(n) = c_{i_0 + \left\lfloor \frac{n}{N_{PN}} \right\rfloor (i_1 - i_0)}(n \bmod N_{PN}) \tag{32c}$$

One implementation is to use $b_q(n)$ as DMRS sequences. Another implementation is to use $B_q(n)$ in Eq. (32b) as new cover code. In this case, the new cover code on each PRB u and two OFDM symbols can written into a matrix form as $$\begin{bmatrix} e^{j\alpha \lfloor \frac{n}{4} \rfloor} w_{q \bmod 2}(0)w_{\lfloor \frac{q}{6} \rfloor}(0) & e^{j\alpha \lfloor \frac{n}{4} \rfloor} w_{q \bmod 2}(0)w_{\lfloor \frac{q}{6} \rfloor}(1) \\ e^{j\beta \lfloor \frac{n}{4} \rfloor} w_{q \bmod 2}(1)w_{\lfloor \frac{q}{6} \rfloor}(0) & e^{j\beta \lfloor \frac{n}{4} \rfloor} w_{q \bmod 2}(1)w_{\lfloor \frac{q}{6} \rfloor}(1) \\ -e^{j\alpha \lfloor \frac{n}{4} \rfloor} w_{q \bmod 2}(0)w_{\lfloor \frac{q}{6} \rfloor}(0) & -e^{j\alpha \lfloor \frac{n}{4} \rfloor} w_{q \bmod 2}(0)w_{\lfloor \frac{q}{6} \rfloor}(1) \\ -e^{j\beta \lfloor \frac{n}{4} \rfloor} w_{q \bmod 2}(1)w_{\lfloor \frac{q}{6} \rfloor}(0) & -e^{j\beta \lfloor \frac{n}{4} \rfloor} w_{q \bmod 2}(1)w_{\lfloor \frac{q}{6} \rfloor}(1) \end{bmatrix}$$

Another implementation is to use the formula $$B'(n) = (-1)^{\lfloor \frac{n}{2} \rfloor}\Bigg(((n+1) \bmod 2) c^*_{i_0 + \left\lfloor \frac{n}{N_{PN}} \right\rfloor (i_1 - i_0)}\left(\left\lfloor \frac{n \bmod N_{PN}}{4} \right\rfloor\right)$$

$$c^*_{i_0 + \left\lfloor \frac{n}{N_{PN}} \right\rfloor (i_1 - i_0)}\left(\left\lfloor \frac{n \bmod N_{PN}}{4} \right\rfloor + 2\right) + (n \bmod 2)$$

$$c^*_{i_0 + \left\lfloor \frac{n}{N_{PN}} \right\rfloor (i_1 - i_0)}\left(\left\lfloor \frac{n \bmod N_{PN}}{4} \right\rfloor + 1\right) c^*_{i_0 + \left\lfloor \frac{n}{N_{PN}} \right\rfloor (i_1 - i_0)}\left(\left\lfloor \frac{n \bmod N_{PN}}{4} \right\rfloor + 3\right)\Bigg)$$

as an additional cover code on NR legacy DMRS sequences $a_q(n)$ in Eq. (3a), NR legacy OCC $A_q(n)$ in (3b) or base sequence C(n) in (3c). In this case, the additional cover code on each PRB u and two OFDM symbols can written into a matrix form as $$\begin{bmatrix} e^{ja\left\lfloor\frac{n}{4}\right\rfloor} & e^{ja\left\lfloor\frac{n}{4}\right\rfloor} \\ e^{j\beta\left\lfloor\frac{n}{4}\right\rfloor} & e^{j\beta\left\lfloor\frac{n}{4}\right\rfloor} \\ -e^{ja\left\lfloor\frac{n}{4}\right\rfloor} & -e^{ja\left\lfloor\frac{n}{4}\right\rfloor} \\ -e^{j\beta\left\lfloor\frac{n}{4}\right\rfloor} & -e^{j\beta\left\lfloor\frac{n}{4}\right\rfloor} \end{bmatrix}$$

Yet another implementation is to use $$(-1)^{\left\lfloor\frac{n}{2}\right\rfloor} c^*_{i_0+\left\lfloor\frac{n}{N_{PN}}\right\rfloor(i_1-i_0)}\left(n \bmod N_{PN} + 2(-1)^{\left\lfloor\frac{n}{2}\right\rfloor}\right)$$

as new base sequence, where $n=0, 1, \ldots, 2N_{PN}-1$.

Furthermore, we can implement Eq. (17) by assigning different cover codes to both different PRBs and to different OFDM symbols. For example, by combining Embodiments 6 and 9, we can have the following Embodiment 10.

Embodiment 10

This embodiment can be obtained from Eq. (17) with $$e^{ja\left\lfloor\frac{n}{4}\right\rfloor} = jc^*_{i_0}\left(4\left\lfloor\frac{n}{4}\right\rfloor\right)c^*_{i_0}\left(4\left\lfloor\frac{n}{4}\right\rfloor+2\right) \cdot e^{j\beta\left\lfloor\frac{n}{4}\right\rfloor} = jc^*_{i_0}\left(4\left\lfloor\frac{n}{4}\right\rfloor+1\right)c^*_{i_0}\left(4\left\lfloor\frac{n}{4}\right\rfloor+3\right),$$

$$\forall\, n = 0, 1, \ldots N_{PN} - 1$$

and $$e^{ja\left\lfloor\frac{n}{4}\right\rfloor} = c^*_{i_1}\left(4\left\lfloor\frac{n \bmod N_{PN}}{4}\right\rfloor\right)c^*_{i_1}\left(4\left\lfloor\frac{n \bmod N_{PN}}{4}\right\rfloor+2\right) \cdot e^{j\beta\left\lfloor\frac{n}{4}\right\rfloor} =$$

$$-c^*_{i_1}\left(4\left\lfloor\frac{n \bmod N_{PN}}{4}\right\rfloor+1\right)c^*_{i_1}\left(4\left\lfloor\frac{n \bmod N_{PN}}{4}\right\rfloor+3\right),$$

$$\forall\, n = N_{PN}, N_{PN} + 1, \ldots 2N_{PN} - 1.$$

In this case, Eq. (17) reduces to $$b_q(n)=B_q(n)\cdot C(n), n=0,1, \ldots 2N_{PN}-1, q=0,1, \ldots, 11 \tag{33a}$$

where $$B_q(n) = j^{1-\left\lfloor\frac{n}{N_{PN}}\right\rfloor}(-1)^{\left\lfloor\frac{n}{2}\right\rfloor+\left\lfloor\frac{n}{N_{PN}}\right\rfloor(n \bmod 2)} \cdot \tag{33b}$$

$$\left(((n+1) \bmod 2)c^*_{i_0+\left\lfloor\frac{n}{N_{PN}}\right\rfloor(i_1-i_0)}\left(\left\lfloor\frac{n \bmod N_{PN}}{4}\right\rfloor\right)c^*_{i_0+\left\lfloor\frac{n}{N_{PN}}\right\rfloor(i_1-i_0)}\right.$$

$$\left(\left\lfloor\frac{n \bmod N_{PN}}{4}\right\rfloor+2\right) + (n \bmod 2)c^*_{i_0+\left\lfloor\frac{n}{N_{PN}}\right\rfloor(i_1-i_0)}\left(\left\lfloor\frac{n \bmod N_{PN}}{4}\right\rfloor+1\right)$$

$$\left. c^*_{i_0+\left\lfloor\frac{n}{N_{PN}}\right\rfloor(i_1-i_0)}\left(\left\lfloor\frac{n \bmod N_{PN}}{4}\right\rfloor+3\right)\right) \cdot w_{q \bmod 2}(n \bmod 2)w_{\left\lfloor\frac{q}{6}\right\rfloor}\left(\left\lfloor\frac{n}{N_{PN}}\right\rfloor\right)$$

and $$C(n) = c_{i_0+\left\lfloor\frac{n}{N_{PN}}\right\rfloor(i_1-i_0)}(n \bmod N_{PN}) \tag{33c}$$

One implementation is to use $b_q(n)$ as DMRS sequences. Another implementation is to use $B_q(n)$ in Eq. (33b) as new cover code. In this case, the new cover code on each PRB u and two OFDM symbols can written into a matrix form as $$\begin{bmatrix} e^{ja\left\lfloor\frac{n}{4}\right\rfloor}w_{q \bmod 2}(0)w_{\left\lfloor\frac{q}{6}\right\rfloor}(0) & e^{ja\left\lfloor\frac{n}{4}\right\rfloor}w_{q \bmod 2}(0)w_{\left\lfloor\frac{q}{6}\right\rfloor}(1) \\ e^{j\beta\left\lfloor\frac{n}{4}\right\rfloor}w_{q \bmod 2}(1)w_{\left\lfloor\frac{q}{6}\right\rfloor}(0) & e^{j\beta\left\lfloor\frac{n}{4}\right\rfloor}w_{q \bmod 2}(1)w_{\left\lfloor\frac{q}{6}\right\rfloor}(1) \\ -e^{ja\left\lfloor\frac{n}{4}\right\rfloor}w_{q \bmod 2}(0)w_{\left\lfloor\frac{q}{6}\right\rfloor}(0) & -e^{ja\left\lfloor\frac{n}{4}\right\rfloor}w_{q \bmod 2}(0)w_{\left\lfloor\frac{q}{6}\right\rfloor}(1) \\ -e^{j\beta\left\lfloor\frac{n}{4}\right\rfloor}w_{q \bmod 2}(1)w_{\left\lfloor\frac{q}{6}\right\rfloor}(0) & -e^{j\beta\left\lfloor\frac{n}{4}\right\rfloor}w_{q \bmod 2}(1)w_{\left\lfloor\frac{q}{6}\right\rfloor}(1) \end{bmatrix}$$

Another implementation is to use $B'(n)=B_q(n)\cdot A_q^*(n)$ as additional cover code on NR legacy DMRS sequences $a_q(n)$ in Eq. (3a), NR legacy OCC $A_q(n)$ in Eq. (3b) or base sequence $C(n)$ in Eq. (3c). In this case, the additional cover code on each PRB u and two OFDM symbols can written into a matrix form as $$\begin{bmatrix} e^{ja\left\lfloor\frac{n}{4}\right\rfloor} & e^{ja\left\lfloor\frac{n}{4}\right\rfloor} \\ e^{j\beta\left\lfloor\frac{n}{4}\right\rfloor} & e^{j\beta\left\lfloor\frac{n}{4}\right\rfloor} \\ -e^{ja\left\lfloor\frac{n}{4}\right\rfloor} & -e^{ja\left\lfloor\frac{n}{4}\right\rfloor} \\ -e^{j\beta\left\lfloor\frac{n}{4}\right\rfloor} & -e^{j\beta\left\lfloor\frac{n}{4}\right\rfloor} \end{bmatrix}$$

Yet another implementation is to use $$j^{1-\left\lfloor\frac{n}{N_{PN}}\right\rfloor}(-1)^{\left\lfloor\frac{n}{2}\right\rfloor+\left\lfloor\frac{n}{N_{PN}}\right\rfloor(n \bmod 2)} \cdot c^*_{i_0+\left\lfloor\frac{n}{N_{PN}}\right\rfloor(i_1-i_0)}\left(n \bmod N_{PN} + 2(-1)^{\left\lfloor\frac{n}{2}\right\rfloor}\right)$$

as new base sequence, where $n=0, 1, \ldots, 2N_{PN}-1$.

In another example, we can extend Embodiment 7 and obtain the following Embodiment 11.

Embodiment 11

This embodiment can be obtained from Eq. (17) with $$\alpha_{\left\lfloor\frac{n}{4}\right\rfloor} = \frac{\pi}{2} + \left\lfloor\frac{n}{4}\right\rfloor\pi, \, \beta_{\left\lfloor\frac{n}{4}\right\rfloor} = \left(1 + \left\lfloor\frac{n}{4}\right\rfloor\right)\pi, \, \forall\, n = 0, 1, \ldots N_{PN} - 1$$

and $$\alpha_{\left\lfloor\frac{n}{4}\right\rfloor} = \left\lfloor\frac{n}{4}\right\rfloor\pi$$

and $$\beta_{\left\lfloor\frac{n}{4}\right\rfloor} = \frac{\pi}{2} + \left\lfloor\frac{n}{4}\right\rfloor\pi, \, \forall\, n = N_{PN}, N_{PN} + 1, \ldots 2N_{PN} - 1.$$

In this case, Eq. (17) reduces to $$b_q(n)=B_q(n)\cdot C(n), n=0,1, \ldots 2N_{PN}-1, q=0,1, \ldots, 11 \tag{34a}$$

where $$B_q(n) = (-1)^{\left\lfloor\frac{n}{2}\right\rfloor+\left\lfloor\frac{n}{4}\right\rfloor}j^{(n \bmod 2)+\left\lfloor\frac{n}{N_{PN}}\right\rfloor} \cdot w_{q \bmod 2}(n \bmod 2)w_{\left\lfloor\frac{q}{6}\right\rfloor}\left(\left\lfloor\frac{n}{N_{PN}}\right\rfloor\right) \tag{34b}$$

and $$C(n) = c_{i_0+\left\lfloor\frac{n}{N_{PN}}\right\rfloor(i_1-i_0)}(n \bmod N_{PN}) \tag{34c}$$

One implementation is to use $b_q(n)$ as DMRS sequences. Another implementation is to use $B_q(n)$ in Eq. (34b) as new cover code. In this case, the new cover code on each PRB u and two OFDM symbols can written into a matrix form as $$(-1)^{\left\lfloor \frac{n}{4} \right\rfloor} \begin{bmatrix} jw_{q\,mod\,2}(0)w_{\left\lfloor \frac{q}{6} \right\rfloor}(0) & w_{q\,mod\,2}(0)w_{\left\lfloor \frac{q}{6} \right\rfloor}(1) \\ -w_{q\,mod\,2}(1)w_{\left\lfloor \frac{q}{6} \right\rfloor}(0) & jw_{q\,mod\,2}(1)w_{\left\lfloor \frac{q}{6} \right\rfloor}(1) \\ -jw_{q\,mod\,2}(0)w_{\left\lfloor \frac{q}{6} \right\rfloor}(0) & -w_{q\,mod\,2}(0)w_{\left\lfloor \frac{q}{6} \right\rfloor}(1) \\ w_{q\,mod\,2}(1)w_{\left\lfloor \frac{q}{6} \right\rfloor}(0) & -jw_{q\,mod\,2}(1)w_{\left\lfloor \frac{q}{6} \right\rfloor}(1) \end{bmatrix}$$

Another implementation is to use $$B'(n) = (-1)^{\left\lfloor \frac{n}{2} \right\rfloor + \left\lfloor \frac{n}{4} \right\rfloor} j^{(n\,mod\,2) + \left\lfloor \frac{n}{N_{PN}} \right\rfloor}$$

as additional cover code on NR legacy DMRS sequences $a_q(n)$ in Eq. (3a), NR legacy OCC $A_q(n)$ in (3b) or base sequence $C(n)$ in Eq. (3c). In this case, the additional cover code on each PRB u and two OFDM symbols can written into a matrix form as $$(-1)^{\left\lfloor \frac{n}{2} \right\rfloor} \begin{bmatrix} j & 1 \\ -1 & j \\ -j & -1 \\ 1 & -j \end{bmatrix}$$

Yet another implementation is to use $$(-1)^{\left\lfloor \frac{n}{2} \right\rfloor} j^{(n\,mod\,2) + \left\lfloor \frac{n}{N_{PN}} \right\rfloor} C(n)$$

as new base sequence, where n=0, 1, . . . , $2N_{PN}$−1.

This embodiment can be viewed as an extension of Embodiment 7, which further multiplies a length-2 OCC code [1−1] to the DMRS sequence generated by Embodiment 7 in the first and second PRB of every two consecutive PRBs. Similarly, in yet another example, we can extend Embodiment 8 and obtain the following Embodiment 12.

Embodiment 12

This embodiment can be obtained from Eq. (17) with $$\alpha_{\left\lfloor \frac{n}{4} \right\rfloor} = \pi/2 + \left\lfloor \frac{n}{4} \right\rfloor \pi, \beta_{\left\lfloor \frac{n}{4} \right\rfloor} = \left\lfloor \frac{n}{4} \right\rfloor \pi, \forall n = 0, 1, \ldots N_{PN} - 1$$

and $$\alpha_{\left\lfloor \frac{n}{4} \right\rfloor} = \left\lfloor \frac{n}{4} \right\rfloor \pi$$

and $$\beta_{\left\lfloor \frac{n}{4} \right\rfloor} = \frac{3\pi}{2} + \left\lfloor \frac{n}{4} \right\rfloor \pi, \forall n = N_{PN}, N_{PN} + 1, \ldots 2N_{PN} - 1.$$

In this case, Eq. (17) reduces to $$b_q(n) = B_q(n) \cdot C(n), n = 0, 1, \ldots 2N_{PN} - 1, q = 0, 1, \ldots, 11 \quad (35a)$$

where $$B_q(n) = (-1)^{\left\lfloor \frac{n}{2} \right\rfloor + \left\lfloor \frac{n}{4} \right\rfloor} j^{3(n\,mod\,2) + \left\lfloor \frac{n}{N_{PN}} \right\rfloor} \cdot w_{q\,mod\,2}(n\,mod\,2) w_{\left\lfloor \frac{q}{6} \right\rfloor}\left(\left\lfloor \frac{n}{N_{PN}} \right\rfloor\right) \quad (35b)$$

and $$C(n) = c_{i_0 + \left\lfloor \frac{n}{N_{PN}} \right\rfloor (i_1 - i_0)}(n\,mod\,N_{PN}) \quad (35c)$$

One implementation is to use $b_q(n)$ as DMRS sequences. Another implementation is to use $B_q(n)$ in Eq. (35b) as new cover code. In this case, the new cover code on each PRB u and two OFDM symbols can written into a matrix form as $$(-1)^{\left\lfloor \frac{n}{4} \right\rfloor} \begin{bmatrix} jw_{q\,mod2}(0)w_{\left\lfloor \frac{q}{6} \right\rfloor}(0) & w_{q\,mod2}(0)w_{\left\lfloor \frac{q}{6} \right\rfloor}(1) \\ w_{q\,mod2}(1)w_{\left\lfloor \frac{q}{6} \right\rfloor}(0) & -jw_{q\,mod2}(1)w_{\left\lfloor \frac{q}{6} \right\rfloor}(1) \\ -jw_{q\,mod2}(0)w_{\left\lfloor \frac{q}{6} \right\rfloor}(0) & -w_{q\,mod2}(0)w_{\left\lfloor \frac{q}{6} \right\rfloor}(1) \\ -w_{q\,mod2}(1)w_{\left\lfloor \frac{q}{6} \right\rfloor}(0) & jw_{q\,mod2}(1)w_{\left\lfloor \frac{q}{6} \right\rfloor}(1) \end{bmatrix}$$

Another implementation is to use $$B'(n) = (-1)^{\left\lfloor \frac{n}{2} \right\rfloor + \left\lfloor \frac{n}{4} \right\rfloor} j^{3(n\,mod\,2) + \left\lfloor \frac{n}{N_{PN}} \right\rfloor}$$

as additional cover code on NR legacy DMRS sequences $a_q(n)$ in Eq. (3a), NR legacy OCC $A_q(n)$ in Eq. (3b) or base sequence $C(n)$ in Eq. (3c). In this case, the additional cover code on each PRB u and two OFDM symbols can written into a matrix form as $$(-1)^{\left\lfloor \frac{n}{4} \right\rfloor} \begin{bmatrix} j & 1 \\ 1 & -j \\ -j & -1 \\ -1 & j \end{bmatrix}$$

Yet another implementation is to use $$(-1)^{\left\lfloor \frac{n}{2} \right\rfloor + \left\lfloor \frac{n}{4} \right\rfloor} j^{3(n\,mod\,2) + \left\lfloor \frac{n}{N_{PN}} \right\rfloor} C(n)$$

as new base sequence, where n=0, 1, . . . , $2N_{PN}$−1.

This embodiment can be viewed as an extension of Embodiment 8, which further multiplies a length-2 OCC code [1−1] to the DMRS sequence generated by Embodiment 8 in the first and second PRB of every two consecutive PRBs.

It should be noticed that we have assumed the port indexes q=0, 1, . . . , 11 for the new DMRS ports. When applying this disclosure, the port indexes can be any 12 different numbers $q_0, q_1, \ldots, q_{11}$, and the mapping between $q_0, q_1, \ldots, q_{11}$ and 12 DMRS sequences generated by (12) with q=0, 1, . . . , 11 can be arbitrary.

Embodiments 1-12 described above are summarized in the following table 2.

TABLE 2

| Embodiment | $\left[\alpha_u, \beta_u, \alpha_{u+\frac{N_{PN}}{4}}, \beta_{u+\frac{N_{PU}}{4}}\right]$ for the first and second OFDM symbols | maximum correlation power within half-PRB | Advantages |
|---|---|---|---|
| | Summary of Embodiments 1-12 | | |
| 1 | [0, 0, 0, 0] | 1 | Simplest solutions, easy to be |
| 2 | [π/2, π/2, π/2, π/2] | 1 | captured in specification |
| 3 | [0, π, 0, π] | 1 | |
| 4 | [0, π/2, 0, π/2] | ½ | The same values for both symbols, |
| 5 | [0, 3π/2, 0, 3π/2] | ½ | the maximum correlation power within half-PRB is ½, so that the interference within half-PRB is reduced. |
| 6 | [π/2, π/2, 0, π] | ¼ | The maximum correlation power within half-PRB is ¼, so that the interference within half-PRB is further reduced. |
| 7 | [π/2, π, 0, π/2] | ¼ | The maximum correlation power |
| 8 | [π/2, 0, 0, 3π/2] | ¼ | within half-PRB is ¼ (within half-PRB and one OFDM symbol is ½), so that the interference within half-PRB is further reduced. |
| 9 | Determined by $c_l(n)$ | Random | Randomize the interference |
| 10 | Determined by $c_l(n)$ | Random | within half PRB |
| 11 | [π/2 + uπ, (1 + u) π, uπ, π/2 + uπ] | ¼ | Additional OCC [1, −1] is added to every two consecutive PRBs to |
| 12 | [π/2 + uπ, uπ, uπ, 3π/2 + uπ] | ¼ | further cancel the DMRS interference |

Hence, from the above Table 2 it is derived that for Embodiments 1-8 and 11-12 the values of $\alpha_u, \beta_u, \lambda_u, \rho_u$ are equal to one of the following combinations:

[0,0,0,0]
[π/2, π/2, π/2,π/2]
[0, π, 0,π]
[0, π/2, 0, π/2]
[0,3π/2, 0,3π/2]
[π/2, π/2,0, π]
[π/2, π, 0, π/2]
[π/2,0,0,3π/2]
[π/2+uπ, (1+u)π, uππ/2+uπ]
[π/2+uπ, uπ, uπ, 3π/2+uπ].

For Embodiments 9 and 10 instead the values of $\alpha_u, \beta_u, \lambda_u, \rho_u$ are dependent on a PRB index u where u is an integer equal to or larger than 0.

Moreover, from Table 2 it can further be derived that a maximum correlation power between two cover codes in the set of cover codes comprises the 1.0, 0.5 or 0.25 in each half PRB according to embodiments of the present disclosure.

Furthermore, some of the embodiments have a maximum correlation power smaller than 1, which means the maximum interference between one new DMRS and one NR legacy DMRS is small. Although the new and legacy DMRSs are designed to be orthogonal in one PRB, they may not be orthogonal at the receiver if the channel has strong frequency selectivity. In this case, there exists interference between DMRSs and low correlation power within half-PRB (specifically, two adjacent subcarriers) will lead to small interference. If the number of new DMRSs is small, the small interference to legacy DMRS is at the same of lower level of noise, so that the performance of legacy DMRS performance is almost not reduced.

Moreover, in the link-level evaluation of the present solution, the following simulation parameters as shown in Table 3 are used.

TABLE 3

Simulation parameters

| Parameters | Values |
|---|---|
| Number of UEs | 8 (4 UE with NR DMRSs and 4 UE with new DMRSs) |
| DMRS ports | {0, 1, 6, 7} for both NR and new DMRSs |
| Number of antennas at gNb | 64 |
| Number of antennas at each UE | 4 |
| Bandwidth | 4 PRBs |
| Precoding frequency-domain granularity | 2 PRBs |
| Channel model | CDL-B (UE speed = 3 km/h) |
| Channel estimator | For NR DMRS: 2D Wiener filter For new DMRS: 1) 2D Wiener filter, 2) PDP-windowing |
| Downlink precoding | Eigen zero-forcing precoding based on real channel estimation |

Figure 6:
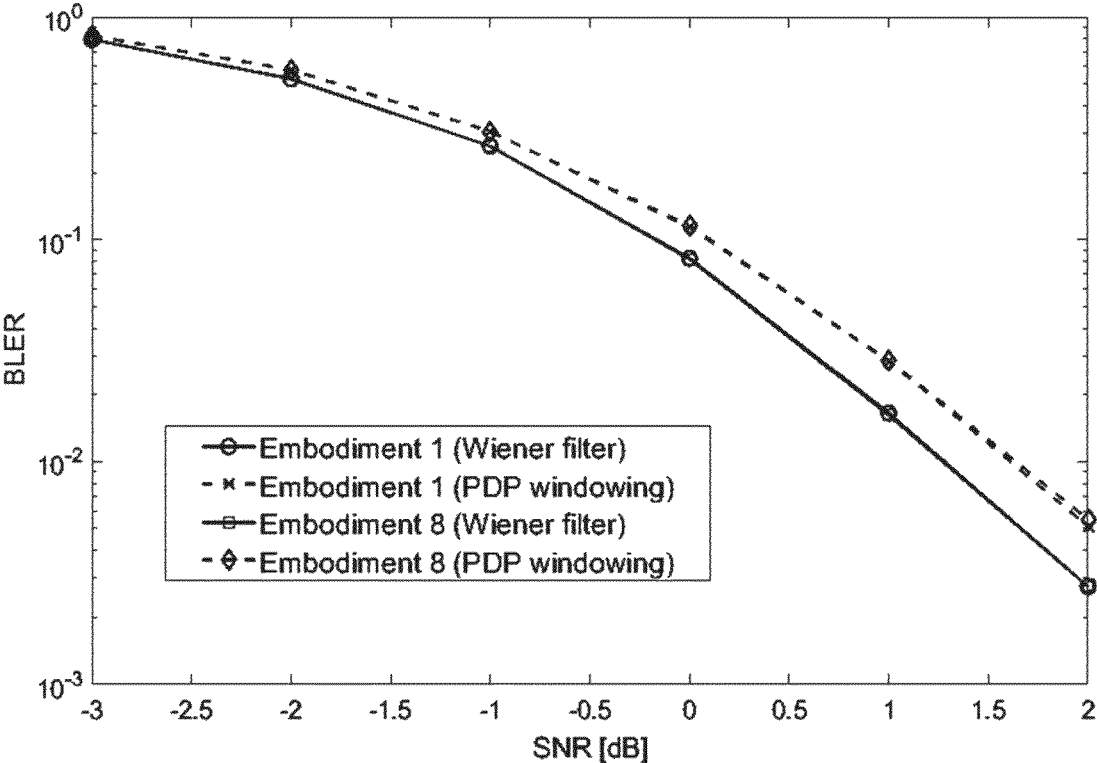
FIG. 6 shows the evaluation results for 8 DMRS ports with two different channel estimators where 4 NR and 4 new DMRSs are transmitted.
Figure 7:
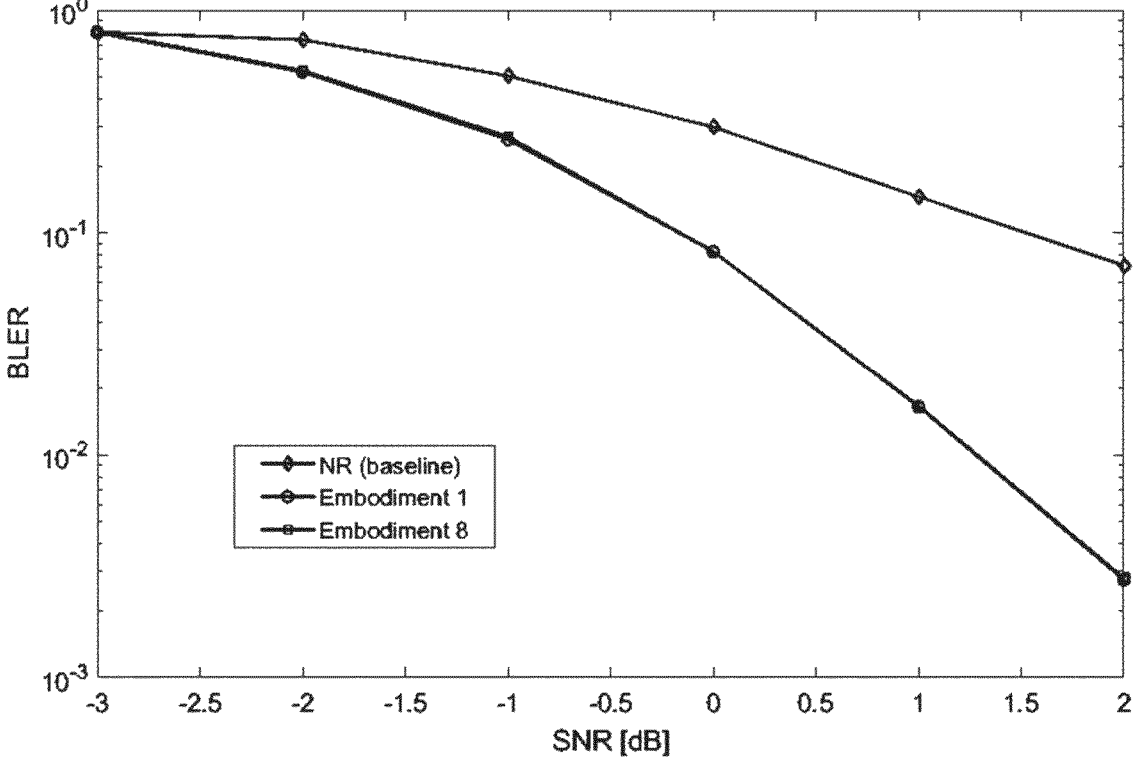
FIG. 7 shows the evaluation results for 8 DMRS ports with Wiener filter and maximum overloaded DMRS resources.
Figure 8:
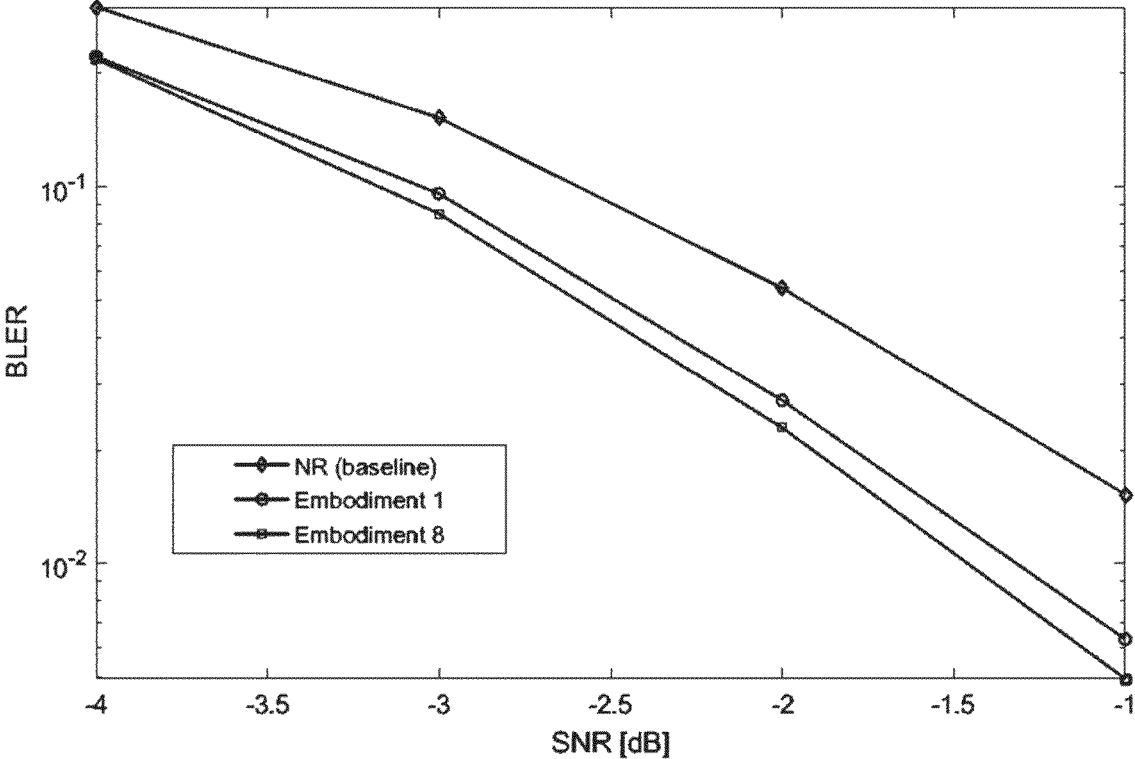
FIG. 8 shows the evaluation results for 5 DMRS ports with Wiener filter and minimum overloaded DMRS resources.

FIG. 6-8 show performance results for embodiments of the present disclosure. The x-axis shows SNR in dB and the y-axis shows the BLER.

In FIG. 6, we compared different channel estimation algorithms for the new DMRS, i.e., channel estimators based 2D Wiener filter and PDP-windowing. Embodiment 1 and 8 of the new DMRS are used in this comparison. The delay spread is assumed to be 129 ns. From FIG. 6, we can observe that for both Embodiment 1 and 8, the 2D Wiener filter based channel estimator outperforms the PDP-windowing based estimator for about 0.2 dB SNR gain at BLER=10%. Thus, in the following evaluation, we will use the channel estimator based on 2D Wiener filter for the new DMRS.

In NR standard, at most 4 DMRS ports can be generated from the same base sequence and transmitted simultaneously on the same time-frequency resources. If it is needed to transmit 4<P≤8 DMRS ports on the same time-frequency resources, the DMRS resources can be considered as overloaded. In the following, we evaluate the BLER performance for two representative scenarios of overloaded DMRS resources, including maximum overloaded DMRS resources (P=8 DMRS ports) and minimum overloaded DMRS resources (P=5 DMRS ports) in FIGS. 7 and 8, respectively. Embodiment 1, 8 and a baseline are simulated.

The baseline is NR DMRS. When the DMRS resources are overloaded, the transmitter will generate the first 4 DMRS sequences by (3) using a PN sequence $c_i(n)$ with initialization value by $c_{init}$ and generate the rest P–4 DMRS sequences by (3) using another PN sequences $c_i'(n)$ with a different initialization value $c'_{init}$. This solution is supportable in current NR spec but (16) is not satisfied, i.e., the DMRS sequences generated by different PN sequences are not orthogonal to each other in each PRB.

In FIG. 7 we compared the performance of Embodiments 1 and 8 with baseline solution for maximum overloaded DMRS resources (i.e. 8 DMRS ports mapped on the same resources). For the Embodiments 1 and 8, 4 NR DMRSs and 4 corresponding new DMRSs are transmitted. From FIG. 7, we can observe that the performance of Embodiments 1 and 8 are similar, which achieve about 1.65 dB SNR gain compared to the NR baseline.

In FIG. 8 we compared Embodiments 1 and 8 with NR baseline with minimum overloaded DMRS resources, i.e. 5 DMRS ports mapped on the same resources. For the Embodiments 1 and 8, 4 NR DMRSs and 1 new DMRSs are transmitted. We have the following observations:

Embodiment 1 achieves about 0.5 dB SNR gain compared to the NR baseline.

Embodiment 8 outperforms Embodiment 1 by about 0.1~0.2 dB SNR gain and outperforms the NR baseline by 0.6~0.7 dB SNR gain. This implies that, besides guaranteeing orthogonality between new and NR DMRSs in each PRB, further keeping low correlation between them in each half PRB can bring extra benefit in term of the data detection performance for the case of non-fully overloaded DMRS resources.

By comparing FIGS. 7 and 8, it can be seen that Embodiment 8 is superior to Embodiment 1 with non-fully overloaded DMRS resources and performs the same as Embodiment 1 with maximum overloaded DMRS resources. Hence Embodiment 8 is advantageous in implementation with dynamic system load.

Consequently, the proposed solution in this disclosure can achieve significant performance gain compared with the NR baseline.

In the current 5G NR system, the Wiener filter based channel estimation is adopted by default by all legacy UEs, which is implemented by the following operations, where $N_{PRB}$ is the number of scheduled PRBs with the same precoding:

Operation 1: the receiver estimates the channel on each DMRS RE by $h_{i,j}=y_{i,j}a_{i,j}^*$, where $y_{i,j}$ and $a_{i,j}$ are the received signal and transmitted DMRS signal on subcarrier i and OFDM symbol j, respectively;

Operation 2: the receiver cancels the interference from other layer's channel by averaging the channel $h_{i,j}$ in each half-PRB, obtaining $2N_{PRB}$ averaged channel which is represented by a length-$2N_{PRB}$ vector $h_{RS}$;

Operation 3: The channel in the whose scheduled bandwidth for data transmission, represented by a length-$12N_{PRB}$ vector $h_{data}$, is obtained by multiplying $h_{RS}$ with a $12N_{PRB}\times2N_{PRB}$ Wiener filter matrix W, i.e., $h_{data}=Wh_{RS}$, where the Wiener filter matrix W is assumed known at the receiver.

When the proposed new DMRSs are transmitted together with the legacy NR DMRSs, the legacy UEs assigned with NR DMRSs will adopt the legacy Wiener filter based channel estimation at the receiver. Hence the channel estimation complexity of these legacy UEs remains unchanged.

For the UEs assigned with new DMRSs, according to the simulation results in FIG. 6, we can see that the Wiener filter based channel estimation performs the best. Thus, in our complexity analysis, we assume that the UEs assigned with new DMRSs also adopt the Wiener filter based channel estimation, but with a slight modification to adapt to the structure of the new DMRSs, as detailed below:

Operation 1: the receiver estimates the channel on each DMRS RE by $h_{i,j}=y_{i,j}a_{i,j}^*$, where $y_{i,j}$ and $a_{i,j}$ are the received signal and transmitted DMRS signal on subcarrier i and OFDM symbol j, respectively;

Operation 2: the receiver cancels the interference from other layer's channel by averaging the channel $h_{i,j}$ in each PRB, obtaining $N_{PRB}$ averaged channel which is represented by a length-$N_{PRB}$ vector $h_{RS}$;

Operation 3: The channel in the whose scheduled bandwidth for data transmission, represented by a length-$12N_{PRB}$ vector $h_{data}$, is obtained by multiplying $h_{RS}$ with a $12N_{PRB}\times N_{PRB}$ Wiener filter matrix W, i.e., $h_{data}=Wh_{RS}$, where the Wiener filter matrix W is known at the receiver.

From the above description, it is easy to compare the channel estimation complexity of legacy NR DMRSs and new DMRSs as follows:

In operation 1, there is no difference from the two kinds of DMRSs, i.e., $8N_{PRB}$ multiplications are needed for both kinds of DMRS.

In operation 2, Legacy NR DMRS needs $6N_{PRB}$ additions but new DMRS needs $7N_{PRB}$ additions.

In operation 3, the operation of matrix multiplication $h_{data}=Wh_{RS}$ for legacy NR DMRS requires $12N_{PRB}$ $(2N_{PRB}-1)$ additions and $24N_{PRB}^2N_{OS}$ multiplications; while that for new DMRSs requires $12N_{PRB}$ $(N_{PRB}-1)$ additions and $12N_{PRB}^2$ multiplications.

The total complexity of legacy UE and a UE according to the present solution is given in the following Table 4. Consequently, the channel estimation based on new DMRS is less complex than that based on legacy NR DMRS, e.g., with about half complexity when $N_{PRB}$ is large.

TABLE 4

| Complexity comparison | | |
|---|---|---|
| UE | #additions | #multiplications |
| Legacy UE | $6N_{PRB} + 12N_{PRB}(2N_{PRB} - 1)$ | $8N_{PRB} + 24N_{PRB}^2$ |
| New UE | $7N_{PRB} + 12N_{PRB}(N_{PRB} - 1)$ | $8N_{PRB} + 12N_{PRB}^2$ |

APPENDIX

In the following Eq. (4) and (16) are proved.

Proof of Eq. (4)

Substituting (3a) into the left hand-side of (4), we have $$\begin{aligned}
&\sum_{n=0}^{1}a_p(2v+n)a_q^*(2v+n)+\sum_{n=0}^{1}a_p(2v+N_{NP}+n)a_q^*(2v+\\
&N_{NP}+n)=\sum_{n=0}^{1}A_p(2v+n)\cdot C(2v+n)A_q^*(2v+n)\cdot C^*\\
&(2v+n)+\sum_{n=0}^{1}A_p(2v+N_{NP}+n)\cdot C(2v+N_{NP}+n)A_q^*\\
&(2v+N_{NP}+n)\cdot C^*(2v+N_{NP}+n)=\sum_{n=0}^{1}A_p(2v+n)\cdot A_q^*\\
&(2v+n)+\sum_{n=0}^{1}A_p(2v+N_{NP}+n)\cdot A_q^*(2v+N_{NP}+n)
\end{aligned}\qquad\text{(A-1)}$$

47

Further substituting (3b) into (A-1) and recalling that $w_0=[1,1]$, $w_1=[1, -1]$, we obtain $$\sum_{n=0}^{1} A_p(2v+n)\cdot A_q^*(2v+n) + \qquad (A-2)$$

$$\sum_{n=0}^{1} A_p(2v+N_{NP}+n)\cdot A_q^*(2v+N_{NP}+n) =$$

$$(w_{p\ mod2}(0)w_{q\ mod2}(0))\cdot\left(w_{\lfloor\frac{p}{6}\rfloor}(0)w_{\lfloor\frac{q}{6}\rfloor}(0)\right) +$$

$$(w_{p\ mod2}(1)w_{q\ mod2}(1))\cdot\left(w_{\lfloor\frac{p}{6}\rfloor}(0)w_{\lfloor\frac{q}{6}\rfloor}(0)\right) +$$

$$(w_{p\ mod2}(0)w_{q\ mod2}(0))\cdot\left(w_{\lfloor\frac{p}{6}\rfloor}(1)w_{\lfloor\frac{q}{6}\rfloor}(1)\right) +$$

$$(w_{p\ mod2}(1)w_{q\ mod2}(1))\cdot\left(w_{\lfloor\frac{p}{6}\rfloor}(1)w_{\lfloor\frac{q}{6}\rfloor}(1)\right) =$$

$$1 + (w_{p\ mod2}(1)w_{q\ mod2}(1)) + \left(w_{\lfloor\frac{p}{6}\rfloor}(1)w_{\lfloor\frac{q}{6}\rfloor}(1)\right) +$$

$$(w_{p\ mod2}(1)w_{p\ mod2}(1))\cdot\left(w_{\lfloor\frac{p}{6}\rfloor}(1)w_{\lfloor\frac{q}{6}\rfloor}(1)\right) =$$

$$\begin{cases} 1-1+1-1=0, & \text{if } p\ mod2 \neq q\ mod2 \text{ and } \lfloor\frac{p}{6}\rfloor = \lfloor\frac{q}{6}\rfloor \\ 1+1-1-1=0, & \text{if } p\ mod2 = q\ mod2 \text{ and } \lfloor\frac{p}{6}\rfloor \neq \lfloor\frac{q}{6}\rfloor \\ 1-1-1+1=0, & \text{if } p\ mod2 \neq q\ mod2 \text{ and } \lfloor\frac{p}{6}\rfloor \neq \lfloor\frac{q}{6}\rfloor \end{cases}$$

Hence (4) is proved. Note that (A-2) doesn't include the case of p mod 2=q mod 2 and $$\lfloor\frac{p}{6}\rfloor = \lfloor\frac{q}{6}\rfloor,$$

as it is impossible for $\forall p\neq q$, p, q$\in$ {0, 1, 6,7}, p, q$\in$ {2, 3, 8, 9} or p, q$\in$ {4, 5, 10, 11}.
Proof of Eq. (16)

The proof of (16) is as follow: From Eq. (3b), it can be verified that $$w_{p\ mod2}(n\ mod2)w_{\lfloor\frac{p}{6}\rfloor}\left(\lfloor\frac{n}{N_{PN}}\rfloor\right)w_{q\ mod2}(n\ mod2)w_{\lfloor\frac{q}{2}\rfloor}\left(\lfloor\frac{n}{N_{PN}}\rfloor\right) = \qquad (A-3)$$

$$\begin{cases} 1, & \text{if } p\ mod2 = q\ mod2, \lfloor\frac{p}{6}\rfloor = \lfloor\frac{q}{6}\rfloor \\ (-1)^{\lfloor\frac{n}{N_{PN}}\rfloor}, & \text{if } p\ mod2 = q\ mod2, \lfloor\frac{p}{6}\rfloor \neq \lfloor\frac{q}{6}\rfloor \\ (-1)^n, & \text{if } p\ mod2 \neq q\ mod2, \lfloor\frac{p}{6}\rfloor = \lfloor\frac{q}{6}\rfloor \\ (-1)^{\lfloor\frac{n}{N_{PN}}\rfloor+(n\ mod2)}, & \text{if } p\ mod2 \neq q\ mod2, \lfloor\frac{p}{6}\rfloor \neq \lfloor\frac{q}{6}\rfloor \end{cases}$$

Then, using (A-1), Eq. (15) can be expressed as $$\sum_{n=0}^{3} A_p^*(4u+n)B'(4u+n)A_q(4u+n) + \qquad (A-4)$$

$$\sum_{n=0}^{3} A_p^*(4u+N_{PN}+n)B'(4u+N_{PN}+n)A_q(4u+N_{PN}+n) =$$

$$\begin{cases} \sum_{n=0}^{3}B'(4u+n)+\sum_{n=0}^{3}B'(4u+N_{PN}+n)=0, & \text{if } p\ mod2=q\ mod2, \lfloor\frac{p}{6}\rfloor=\lfloor\frac{q}{6}\rfloor \\ \sum_{n=0}^{3}B'(4u+n)-\sum_{n=0}^{3}(-1)^{\lfloor\frac{n}{N_{PN}}\rfloor}B'(4u+N_{PN}+n)=0, & \text{if } p\ mod2=q\ mod2, \lfloor\frac{p}{6}\rfloor\neq\lfloor\frac{q}{6}\rfloor \\ \sum_{n=0}^{3}(-1)^nB'(4u+n)+\sum_{n=0}^{3}(-1)^nB'(4u+N_{PN}+n)=0, & \text{if } p\ mod2\neq q\ mod2, \lfloor\frac{p}{6}\rfloor=\lfloor\frac{q}{6}\rfloor \\ \sum_{n=0}^{3}(-1)^nB'(4u+n)-\sum_{n=0}^{3}(-1)^nB'(4u+N_{PN}+n)=0, & \text{if } p\ mod2\neq q\ mod2, \lfloor\frac{p}{6}\rfloor\neq\lfloor\frac{q}{6}\rfloor \end{cases}$$

48

The first two equations of (A-4) are equivalent to $\Sigma_{n=0}^{3}B'(4u+n)=0$, $\forall u=0, 1, \ldots, 2N_{PN}-1$, and the last two equations of (A-4) are equivalent to $\Sigma_{n=0}^{3}(-1)^nB'(4u+n)=0$, $\forall u=0, 1, \ldots, 2N_{PN}-1$. Thus, Eq. (16) is proved.

Furthermore, any method according to embodiments of the disclosure may be implemented in a computer program, having code means, which when run by processing means causes the processing means to execute the operations of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first communication device 100 and the second communication device 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first communication device 100 and the second communication device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A first communication device, comprising:

a processor; and a memory coupled to the processor and storing instructions, which when executed by the processor, cause the first communication device to:

determine a demodulation reference signal (DMRS) sequence based on a cover code in a set of cover codes, determine a DMRS by mapping the DMRS sequence onto one or more physical resource blocks (PRBs), wherein the cover code is dependent on a DMRS antenna port index, cover codes in the set of cover codes are orthogonal to each other in each PRB, and a maximum correlation power between two cover codes in the set of cover codes is larger than 0 in each half PRB, and transmit the DMRS via a DMRS antenna port having the DMRS antenna port index to a second communication device.

2. The first communication device according to claim 1, wherein a maximum correlation power between two cover codes in the set of cover codes comprises 1.0, 0.5, or 0.25 in each half PRB.

3. The first communication device according to claim 1, wherein at least one cover code in the set of cover codes in each PRB is defined by following formula:

$$\begin{bmatrix} e^{j\alpha_u}w_{q\ mod2}(0)w_{\lfloor \frac{q}{6}\rfloor}(0) & e^{j\lambda_u}w_{q\ mod2}(0)w_{\lfloor \frac{q}{6}\rfloor}(1) \\ e^{j\beta_u}w_{q\ mod2}(1)w_{\lfloor \frac{q}{6}\rfloor}(0) & e^{j\rho_u}w_{q\ mod2}(1)w_{\lfloor \frac{q}{6}\rfloor}(1) \\ -e^{j\alpha_u}w_{q\ mod2}(0)w_{\lfloor \frac{q}{6}\rfloor}(0) & -e^{j\lambda_u}w_{q\ mod2}(0)w_{\lfloor \frac{q}{6}\rfloor}(1) \\ -e^{j\beta_u}w_{q\ mod2}(1)w_{\lfloor \frac{q}{6}\rfloor}(0) & -e^{j\rho_u}w_{q\ mod2}(1)w_{\lfloor \frac{q}{6}\rfloor}(1) \end{bmatrix}$$

wherein q is determined by the DMRS antenna port index, and $\alpha_u, \beta_u, \lambda_u, \rho_u$ are real numbers for PRB index u, and u is an integer equal to or larger than 0 and $w_0(0)=1$, $w_0(1)=1$, $w_1(0)=1$, $w_1(1)=-1$.

4. The first communication device according to claim 1, wherein at least one cover code in the set of cover codes in each PRB is defined by following formula $$\begin{bmatrix} e^{j\alpha_u} & e^{j\lambda_u} \\ e^{j\beta_u} & e^{j\rho_u} \\ -e^{j\alpha_u} & -e^{j\lambda_u} \\ -e^{j\beta_u} & -e^{j\rho_u} \end{bmatrix}$$

wherein $\alpha_u, \beta_u, \lambda_u, \rho_u$ are real numbers for PRB index u, and u is an integer equal to or larger than 0.

5. The first communication device according to claim 4, wherein the DMRS sequence is obtained based on the at least one cover code and a DMRS sequence associated with an another DMRS antenna port index.

6. The first communication device according to claim 3, wherein the at least one cover code is a combination of a time domain cover code and a frequency domain cover code when $\alpha_u+\rho_u=\beta_u+\lambda_u$.

7. The first communication device according to claim 1, wherein at least one cover code in the set of cover codes is obtained based on an additional cover code defined by following formula $$\begin{bmatrix} e^{j\alpha_u} & e^{j\lambda_u} \\ e^{j\beta_u} & e^{j\rho_u} \\ -e^{j\alpha_u} & -e^{j\lambda_u} \\ -e^{j\beta_u} & -e^{j\rho_u} \end{bmatrix}$$

and an orthogonal cover code, wherein $\alpha_u, \beta_u, \lambda_u, \rho_u$ are real numbers for PRB index u, and u is an integer equal to or larger than 0.

8. The first communication device according to claim 7, wherein the additional cover code is a combination of a time domain additional cover code and a frequency domain additional cover code when $\alpha_u+\rho_u=\beta_u+\lambda_u$.

9. The first communication device according to claim 3, wherein the values of $\alpha_u, \beta_u, \lambda_u, \rho_u$ are equal to one of following combinations:

[0,0,0,0]

$[\pi/2, \pi/2, \pi/2, \pi/2]$ $[0, \pi, 0, \pi]$ $[0, \pi/2, 0, \pi/2]$ $[0, 3\pi/2, 0, 3\pi/2]$ $[\pi/2, \pi/2, 0, \pi]$ $[\pi/2, \pi, 0, \pi/2]$ $[\pi/2, 0, 0, 3\pi/2]$ $[\pi/2+u\pi, (1+u)\pi, u\pi\pi/2+u\pi]$ $[\pi/2+u\pi, u\pi, u\pi, 3\pi/2+u\pi]$.

10. The first communication device according to claim 3, wherein the values of $\alpha_u, \beta_u, \lambda_u, \rho_u$ are dependent on a PRB index u, and u is an integer equal to or larger than 0.

11. The first communication device according to claim 1, wherein the instructions, when executed by the processor, cause the first communication device to obtain a first indicator indicating at least one DMRS antenna port index between 0-23; or obtain a first indicator and a second indicator, wherein the first indicator indicates at least one DMRS antenna port index between 0-11 or 12-23, and the second indicator indicates whether the at least one DMRS antenna port index is between 0-11 or 12-23; or obtain a first indicator and a second indicator, wherein the first indicator indicates at least one DMRS antenna port index between 0-11, and the second indicator indicates any of the DMRS sequence, the cover code, or an additional cover code for the at least one DMRS antenna port index.

12. A second communication device, comprising:

a processor; and a memory coupled to the processor and storing instructions, which when executed by the processor, cause the second communication device to:

receive a demodulation reference signal (DMRS) and associated data signal on one or more PRBs from a first communication device, determine a DMRS sequence based on a cover code in a set of cover codes, wherein the cover code is dependent on a DMRS antenna port index, the cover codes in the set of cover codes are orthogonal to each other in each PRB, and a maximum correlation power between two cover codes in the set of cover codes is larger than 0 in each half PRB, and demodulate the associated data signal based on the received DMRS and the DMRS sequence.

13. The second communication device according to claim 12, wherein a maximum correlation power between two cover codes in the set of cover codes comprises 1.0, 0.5 or 0.25 in each half PRB.

14. The second communication device according to claim 12, wherein at least one cover code in the set of cover codes in each PRB is defined by following formula:

$$
\begin{bmatrix}
e^{j\alpha_u}w_{q\,mod2}(0)w_{\lfloor\frac{q}{6}\rfloor}(0) & e^{j\lambda_u}w_{q\,mod2}(0)w_{\lfloor\frac{q}{6}\rfloor}(1) \\
e^{j\beta_u}w_{q\,mod2}(1)w_{\lfloor\frac{q}{6}\rfloor}(0) & e^{j\rho_u}w_{q\,mod2}(1)w_{\lfloor\frac{q}{6}\rfloor}(1) \\
-e^{j\alpha_u}w_{q\,mod2}(0)w_{\lfloor\frac{q}{6}\rfloor}(0) & -e^{j\lambda_u}w_{q\,mod2}(0)w_{\lfloor\frac{q}{6}\rfloor}(1) \\
-e^{j\beta_u}w_{q\,mod2}(1)w_{\lfloor\frac{q}{6}\rfloor}(0) & -e^{j\rho_u}w_{q\,mod2}(1)w_{\lfloor\frac{q}{6}\rfloor}(1)
\end{bmatrix}
$$

wherein q is determined by the DMRS antenna port index, and $\alpha_u,\beta_u,\lambda_u,\rho_u$ are real numbers for PRB index u, and wherein u is an integer equal to or larger than 0 and $w_0(0)=1$, $w_0(1)=1,w_1(0)=1$, $w_1(1)=-1$.

15. The second communication device according to claim 12, wherein at least one cover code in the set of cover codes in each PRB is defined by following formula:

$$
\begin{bmatrix}
e^{j\alpha_u} & e^{j\lambda_u} \\
e^{j\beta_u} & e^{j\rho_u} \\
-e^{j\alpha_u} & -e^{j\lambda_u} \\
-e^{j\beta_u} & -e^{j\rho_u}
\end{bmatrix}
$$

wherein $\alpha_u,\beta_u,\lambda_u,\rho_u$ are real numbers for PRB index u, and u is an integer equal to or larger than 0.

16. The second communication device according to claim 15, wherein the DMRS sequence is obtained based on the at least one cover code and a DMRS sequence associated with an another DMRS antenna port index.

17. The second communication device according to claim 14, wherein the at least one cover code is a combination of a time domain cover code and a frequency domain cover code when $\alpha_u+\rho_u=\beta_u+\lambda_u$.

18. The second communication device according to claim 12, wherein at least one cover code in the set of cover codes is obtained based on an additional cover code given by following formula:

$$
\begin{bmatrix}
e^{j\alpha_u} & e^{j\lambda_u} \\
e^{j\beta_u} & e^{j\rho_u} \\
-e^{j\alpha_u} & -e^{j\lambda_u} \\
-e^{j\beta_u} & -e^{j\rho_u}
\end{bmatrix}
$$

and an orthogonal cover code, wherein $\alpha_u,\beta_u,\lambda_u,\rho_u$ are real numbers for PRB index u and u is an integer equal to or larger than 0.

19. The second communication device according to claim 18, wherein the additional cover code is a combination of a time domain additional cover code and a frequency domain additional cover code when $\alpha_u+\rho_u=\beta_u+\lambda_u$.

20. A method performed by a first communication device, comprising:

determining a demodulation reference signal (DMRS) sequence based on a cover code in a set of cover codes;

determining a DMRS by mapping the DMRS sequence onto one or more physical resource blocks (PRBs), wherein the cover code is dependent on a DMRS antenna port index, cover codes in the set of cover codes are orthogonal to each other in each PRB, and a maximum correlation power between two cover codes in the set of cover codes is larger than 0 in each half PRB; and transmitting the DMRS via a DMRS antenna port having DMRS antenna port index to a second communication device.

\* \* \* \* \*